United States Patent
Ikeda

(10) Patent No.: US 12,462,601 B2
(45) Date of Patent: *Nov. 4, 2025

(54) INFORMATION PROCESSING DEVICE AND RECOGNITION SUPPORT METHOD

(71) Applicant: NEC Corporation, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,698

(22) Filed: Jan. 10, 2024

(65) Prior Publication Data

US 2024/0203159 A1 Jun. 20, 2024

Related U.S. Application Data

(63) Continuation of application No. 18/156,616, filed on Jan. 19, 2023, now Pat. No. 11,915,516, which is a (Continued)

(30) Foreign Application Priority Data

Aug. 27, 2014 (JP) .................................. 2014-173111

(51) Int. Cl.
*G06V 10/20* (2022.01)
*G06T 7/60* (2017.01)
(Continued)

(52) U.S. Cl.
CPC .............. *G06V 40/166* (2022.01); *G06T 7/60* (2013.01); *G06V 10/20* (2022.01); *G06V 10/32* (2022.01); *G06V 10/40* (2022.01); *G06V 10/245* (2022.01)

(58) Field of Classification Search
CPC ...... G06V 10/40; G06V 10/20; G06V 10/245; G06V 10/32; G06V 40/166; G06T 7/60; G06K 9/00; G06F 18/00

See application file for complete search history.

(56) References Cited

U.S. PATENT DOCUMENTS 8,594,375 B1 11/2013 Ogasawara et al.
8,594,376 B2 11/2013 Ogasawara et al.
(Continued)

FOREIGN PATENT DOCUMENTS

JP    2002-56387     2/2002
JP    2004-215235 A  7/2004
(Continued)

OTHER PUBLICATIONS

Japanese Office Action for JP Application No. 2020-104450 mailed on Jul. 27, 2021 with English Translation.
(Continued)

*Primary Examiner* — Sheela C Chawan

(57) ABSTRACT

In order to acquire recognition environment information impacting the recognition accuracy of a recognition engine, an information processing device 100 comprises a detection unit 101 and an environment acquisition unit 102. The detection unit 101 detects a marker, which has been disposed within a recognition target zone for the purpose of acquiring information, from an image captured by means of an imaging device which captures images of objects located within the recognition target zone. The environment acquisition unit 102 acquires the recognition environment information based on image information of the detected marker. The recognition environment information is information representing the way in which a recognition target object is reproduced in an image captured by the imaging device when said imaging device captures an image of the recognition target object located within the recognition target zone.

15 Claims, 15 Drawing Sheets

Related U.S. Application Data continuation of application No. 17/033,089, filed on Sep. 25, 2020, now Pat. No. 11,580,720, which is a continuation of application No. 16/283,489, filed on Feb. 22, 2019, now Pat. No. 10,824,900, which is a continuation of application No. 15/506,508, filed as application No. PCT/JP2015/004148 on Aug. 19, 2015, now Pat. No. 10,248,881.

(51) Int. Cl.
*G06V 10/32* (2022.01)
*G06V 10/40* (2022.01)
*G06V 40/16* (2022.01)
*G06V 10/24* (2022.01)

(56) References Cited

U.S. PATENT DOCUMENTS

| | | | |
|---|---|---|---|
| 8,682,095 B2 | 3/2014 | Lee | G06V 10/28 |
| | | | 382/172 |
| 8,934,667 B2 | 1/2015 | Osman | |
| 9,189,699 B2 | 11/2015 | Liu et al. | |
| 9,292,974 B2 | 3/2016 | Kaino et al. | |
| 9,832,385 B2 | 11/2017 | Kuwabara | G06V 10/245 |
| 10,248,881 B2 | 4/2019 | Ikeda | |
| 10,824,900 B2 | 11/2020 | Keda | G06V 10/245 |
| 11,580,720 B2 | 2/2023 | Ikeda | G06V 10/40 |
| 11,915,516 B2 * | 2/2024 | Ikeda | G06V 10/20 |
| 2007/0172122 A1 | 7/2007 | Kouno et al. | |
| 2009/0010496 A1 | 1/2009 | Saito et al. | |
| 2013/0265330 A1 | 10/2013 | Goto et al. | |

FOREIGN PATENT DOCUMENTS

| | | |
|---|---|---|
| JP | 2005-182350 | 7/2005 |
| JP | 2006-261995 A | 9/2006 |
| JP | 2007-201632 | 8/2007 |
| JP | 2007-295946 A | 11/2007 |
| JP | 2008-205774 A | 9/2008 |
| JP | 2008-249407 A | 10/2008 |
| JP | 2010-192998 A | 9/2010 |
| JP | 2012-237609 A | 12/2012 |
| JP | 2013-134599 A | 7/2013 |
| JP | 2014-16824 | 1/2014 |
| JP | 2014-56450 | 3/2014 |
| JP | 2014-130429 | 7/2014 |
| JP | 2014-154113 A | 8/2014 |

OTHER PUBLICATIONS

Japanese Office Action issued by the Japanese Patent Office in corresponding application No. JP 2016-544943, dated Oct. 1, 2019.
International Search Report and Written Opinion mailed Oct. 20, 2015, in corresponding PCT International Application.
Japanese Office Communication for JP Application No. 2022-021696 mailed on Feb. 28, 2023 with English Translation.
Masayuki Kanbara and Naokazu Yokoya, "Real-time Estimation of Light Source Environment for Photorealistic Augmented Reality", Proceedings of the 17th International Conference on Pattern Recognition(ICPR'2004).
Bunyo Okumura, Masayuki Kanbara and Naokazu Yokoya, "Image Composition Based on Blur Estimation of Real Image for Augmented Reality", FIT2005 4th Forum on Information Technology.
JP Office Action for JP Application No. 2024-067895, mailed on Mar. 18, 2025 with English Translation.

* cited by examiner

INFORMATION PROCESSING DEVICE AND RECOGNITION SUPPORT METHOD

CROSS-REFERENCE TO RELATED PATENT APPLICATIONS

This application is a continuation of U.S. patent application Ser. No. 18/156,616, filed Jan. 19, 2023, which is a continuation of U.S. patent application Ser. No. 17/033,089, filed Sep. 25, 2020, now U.S. Pat. No. 11,580,720, which is a continuation of U.S. patent application Ser. No. 16/283,489, filed Feb. 22, 2019, now U.S. Pat. No. 10,824,900, which is a continuation of U.S. Ser. No. 15/506,508, filed Feb. 24, 2017, now U.S. Pat. No. 10,248,881, which is a National Stage Entry of International Application No. PCT/JP2015/004148, filed Aug. 19, 2015, which claims priority from Japanese Patent Application No. 2014-173111, filed Aug. 27, 2014. The entire contents of the above-referenced applications are expressly incorporated herein by reference.

TECHNICAL FIELD

The present invention relates to a support technique for image recognition.

BACKGROUND ART

By an image recognition technique, a computer is able to recognize various subjects such as a person, a face, a product, an animal, a vehicle, an obstacle, a character, and a two-dimensional code from an image. Various improvements are made in order to enhance recognition precision of recognition processing as described above. For instance, PTL 1 proposes a method, in which an amount of exposure of a plurality of cameras is adjusted in such a manner that the number of disparity values calculated regarding a stereoscopic object to be recognized increases in order to enhance recognition precision of the stereoscopic object. Further, PTL 2 describes an improvement on a feature pattern stored in a dictionary in order to enhance precision of individual recognition of a face. Specifically, in a configuration described in PTL 2, a feature pattern obtained by combining a feature of a target portion on a face area of a subject, and a feature of a portion other than the target portion is stored in a dictionary as a feature pattern for identifying the subject.

CITATION LIST

Patent Literature

[PTL 1] Japanese Laid-open Patent Publication No. 2014-130429
[PTL 2] Japanese Laid-open Patent Publication No. 2014-16824

SUMMARY OF INVENTION

Technical Problem

Various methods as described above are proposed in order to obtain a recognition engine which implements high recognition precision. However, even when a high-precision recognition engine is delivered to a customer, and an operator adjusts the recognition engine to be in conformity with an environment of the customer, recognition precision of a specification may not be secured. This is because a target object to be recognized within an image, to which a recognition engine applies image processing, has an appearance (reflection) which is unexpected before delivery on the customer side.

Note that in the present description, an appearance (reflection) of a target object to be recognized within an image, to which a recognition engine applies image processing, is described as a recognition environment. The recognition environment is affected by various factors such as an installation position of a camera, an angle of the camera (an orientation of a lens), the number of cameras, a specification of the camera, a lighting condition within a field of view of the camera, and a position or an orientation of the target object to be recognized. Precision of the specification may not be secured for the recognition engine depending on such the recognition environment, and reliability of the recognition engine may be lowered.

The present invention is conceived in order to solve the inconvenience that precision of the recognition engine may be lowered depending on the recognition environment. Specifically, a main object of the present invention is to provide a technique for acquiring information on the recognition environment which may affect recognition precision of the recognition engine.

Solution to Problem

To achieve the main object of the present invention, an information processing device of the present invention includes:
  detection means for detecting a marker from an image captured by an imaging device, the marker being disposed within a target area to be recognized, the imaging device capturing an object located within the target area; and
  in environment acquisition means for acquiring recognition environment information based on image information on the marker detected, the recognition environment information representing an appearance of a target object to be recognized in a captured image by the imaging device when the target object locates within the target area and is captured by the imaging device.

A recognition support method of the present invention includes:
  by a computer,
  detecting a marker from an image captured by an imaging device, the marker being disposed within a target area to be recognized, the imaging device capturing an object located within the target area; and
  acquiring recognition environment information based on image information on the marker detected, the recognition environment information representing an appearance of a target object to be recognized in a captured image by the imaging device when the target object locates within the target area and is captured by the imaging device.

A program storage medium of the present invention storing a computer program, the computer program causes a computer to execute:
  detecting a marker from an image captured by an imaging device, the marker being disposed within a target area to be recognized, the imaging device capturing an object located within the target area; and
  acquiring recognition environment information based on image information on the marker detected, the recognition environment information representing an appearance of a target object to be recognized in a captured image by the imaging device when the target object locates within the target area and is captured by the imaging device.

Note that the main object of the present invention is also achieved by the recognition support method according to the present invention associated with the information processing device according to the present invention. Further, the main object of the present invention is also achieved by the computer program associated with the information processing device and the recognition support method according to the present invention, and the program storage medium storing the computer program.

Advantageous Effects of Invention

The information processing device and the recognition support method according to the present invention are able to acquire information on the recognition environment which may affect recognition precision of the recognition engine. This allows an operator who delivers the recognition engine to a customer to perform adjustment regarding image processing of the recognition engine with use of acquired information on the recognition environment, for example. Further, an operator is allowed to proceed with preparation for adjustment relating to image processing of the recognition engine by acquiring information on the recognition environment in advance. Thus, the information processing device and the recognition support method according to the present invention enable to suppress lowering of precision of the recognition engine, and to prevent lowering of reliability with respect to the recognition engine.

DESCRIPTION OF EMBODIMENTS

Figure 1:
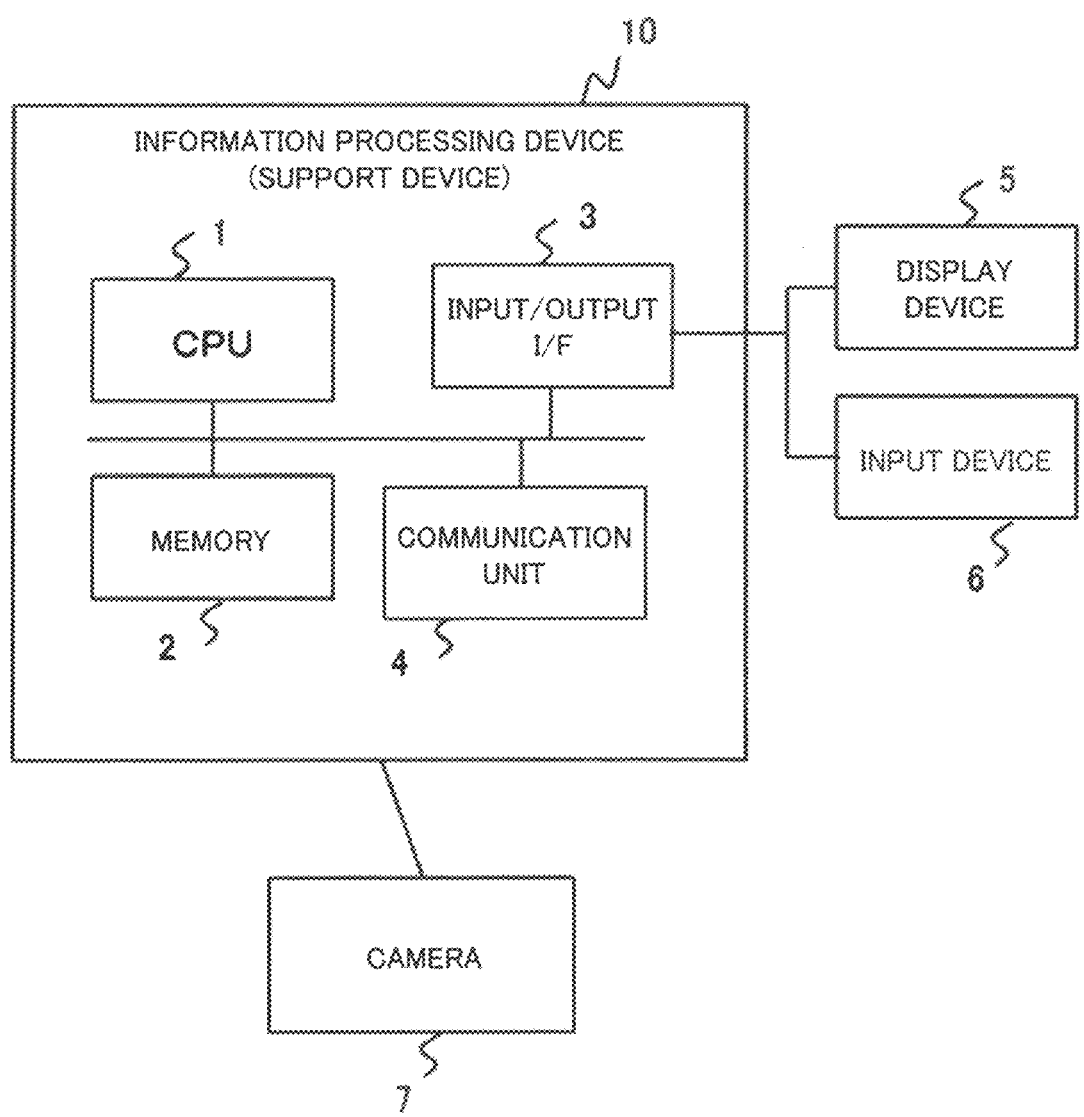
FIG. 1 is a block diagram conceptually illustrating a hardware configuration of an information processing device (a support device) in a first example embodiment.

In the following, example embodiments according to the present invention are described referring to the drawings. Note that each of the example embodiments described in the following is an example. The present invention is not limited to a configuration of each of the example embodiments described in the following.

First Example Embodiment

—Device Configuration—

FIG. 1 is a diagram conceptually illustrating a hardware configuration of an information processing device of the first example embodiment according to the present invention. An information processing device (hereinafter, abbreviated as a support device) 10 is a computer. As illustrated in FIG. 1, the support device 10 includes a CPU (Central Processing Unit) 1, a memory 2, an input/output interface I/F (InterFace) 3, and a communication unit 4. These components are connected to each other by a bus. Note that the aforementioned hardware configuration is an example. The hardware configuration of the support device 10 is not limited to the configuration illustrated in FIG. 1.

The CPU 1 is an arithmetic device. The CPU 1 may include an application specific integrated circuit (ASIC), a DSP (Digital Signal Processor), a GPU (Graphics Processing Unit), and the like in addition to a general CPU.

The memory 2 is a storage device which stores a computer program (hereinafter, also described as a program) and data. For instance, as the memory 2, an RAM (Random Access Memory), an ROM (Read Only Memory), an auxiliary storage device (e.g. a hard disk device), or the like is incorporated in the support device 10.

The input/output I/F 3 is connectable to a user interface device provided in a display device 5, an input device 6, and the like, which is a peripheral device of the support device 10. The input/output I/F 3 has a function of enabling information communication between the support device 10 and the peripheral device (the display device 5 and the input device 6). Note that the input/output I/F 3 may also be connectable to a portable storage medium or an external storage device.

The display device 5 is a device which displays drawing data processed by the CPU 1 or the like on a screen. Specific examples of the display device 5 are, for instance, an LCD (Liquid Crystal Display) and a CRT (Cathode Ray Tube) display.

The input device 6 is a device which receives information to be input by a user operation. Specific examples of the input device 6 are, for instance, a keyboard and a mouse.

Note that the display device 5 and the input device 6 may be integrally formed. A device obtained by integrally forming the display device 5 and the input device 6 is, for instance, a touch panel.

The communication unit 4 has a function of exchanging information (signal) with another computer or another device via an information communication network (not illustrated).

The support device 10 illustrated in FIG. 1 has a hardware configuration as described above. However, the support device 10 may also include a hardware component which is not illustrated in FIG. 1. In other words, the hardware configuration of the support device 10 is not limited to the configuration illustrated in FIG. 1.

The support device 10 is connected via an information communication network, or is directly connected to a camera 7. The camera 7 is an imaging device, and has a function of transmitting information (video image signal) of a captured video image (a moving image) to the support device 10. In the first example embodiment, the camera 7 is installed in a state that the orientation of the camera 7 (the orientation of a lens), the height of the camera 7, or the like is adjusted to capture a predetermined capturing area. Note that the camera 7 may capture a still image, and transmit information on the still image (video image signal) to the support device 10. Further, the number of cameras 7 may be one or more, and may be appropriately set.

—Processing Configuration—

Figure 2:
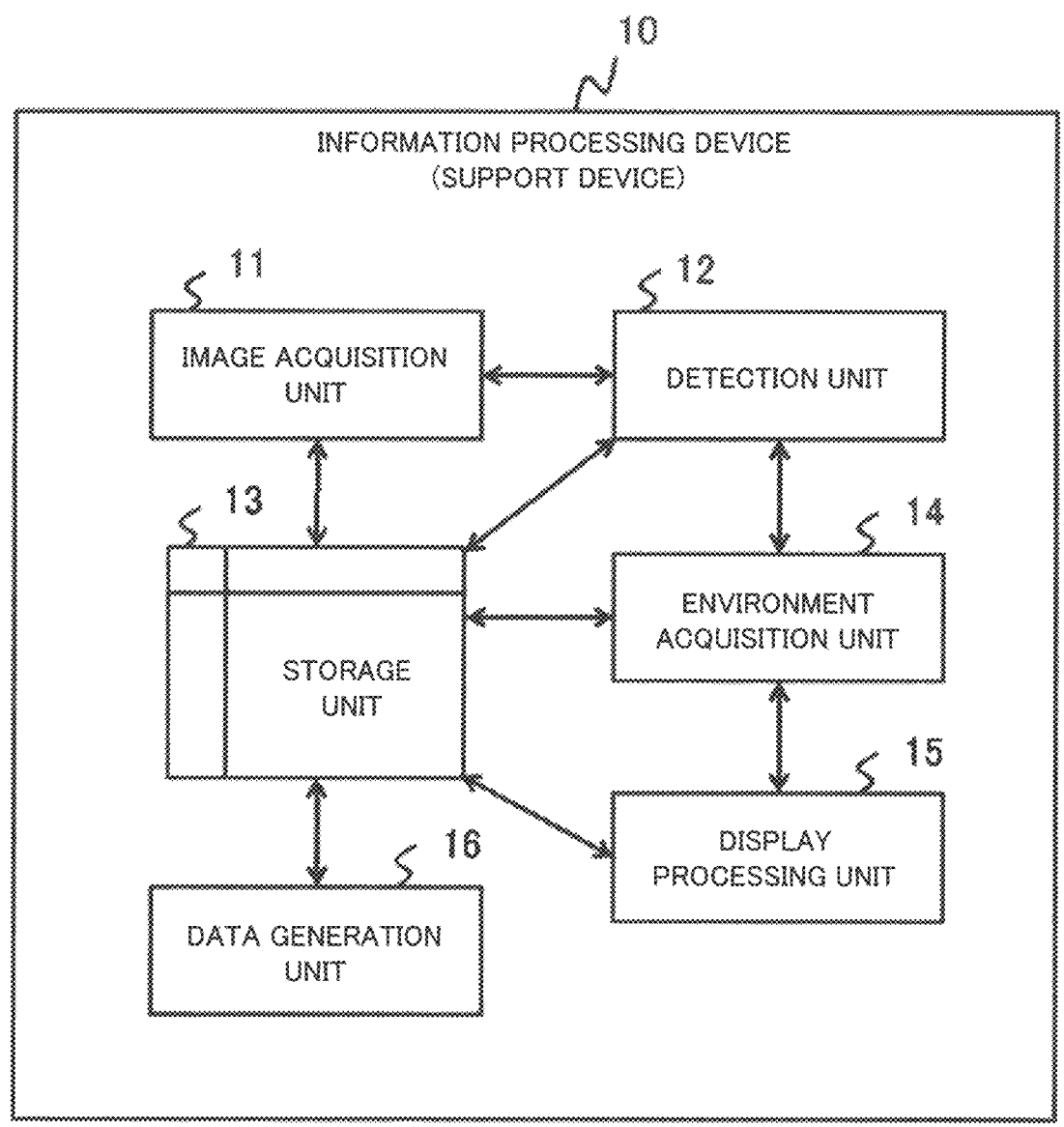
FIG. 2 is a block diagram conceptually illustrating a control configuration of the support device in the first example embodiment.

FIG. 2 is a block diagram conceptually illustrating a control configuration of the support device 10 of the first example embodiment. Note that in FIG. 2, directions of arrows in the drawing indicate an example, and do not limit the directions of signals between blocks.

The support device 10 includes an image acquisition unit 11, a detection unit 12, a storage unit 13, an environment acquisition unit 14, a display processing unit 15, and a data generation unit 16. A functional unit including the image acquisition unit 11, the detection unit 12, the environment acquisition unit 14, the display processing unit 15, and the data generation unit 16 is implemented by the CPU 1, for instance. Specifically, by causing the CPU 1 to execute the program stored in the memory 2, functions of the image acquisition unit 11, the detection unit 12, the environment acquisition unit 14, the display processing unit 15, and the data generation unit 16 are implemented. Note that the program is stored in the memory 2 by reading the program from a portable storage medium (e.g. a CD (Compact Disc) or a memory card), or from another computer connected via an information communication network into the support device 10.

The storage unit 13 has a function of storing data, and, for instance, is implemented by a storage device such as an RAM or a hard disk device. The storage unit 13 stores information to be acquired by each of the image acquisition unit 11, the detection unit 12, and the environment acquisition unit 14. Further, the storage unit 13 also stores various pieces of information to be used for processing by the functional units such as the detection unit 12 or the environment acquisition unit 14.

The image acquisition unit 11 has a function of acquiring the image captured by the camera 7. For instance, the image acquisition unit 11 successively acquires the image by capturing the video image signal transmitted from the camera 7 at a predetermined timing (reading and storing the read video image signal in the storage unit 13, for instance). The timing at which the image is captured is, for instance, a predetermined time interval. Further, the image acquisition unit 11 further has a function of reading the video image signal transmitted from the camera 7, and transmitting the video image signal toward the display device 5. In transmitting the video image signal, the image acquisition unit 11 transmits a control signal indicating displaying the video image signal to the display device 5. In this way, the display device 5 displays a video image (a moving image or a still image) based on the video image signal.

The detection unit 12 has a function of detecting the marker from the image acquired by the image acquisition unit 11 with image processing. In this example, the marker is an object placed within a capturing area to be captured by the camera 7, and has a design or a color distinguishable from a background or a subject other than the marker within the image captured by the camera 7. For instance, the storage unit 13 stores in advance identification information on the design or the color for use in distinguishing the marker from the background or another subject. The detection unit 12 detects the marker from the image acquired by the image acquisition unit 11 (the captured image by the camera 7) by image processing with use of these pieces of information. Various processing are proposed regarding image processing to be performed by the detection unit 12 for detecting the marker. In this example, the image processing to be performed by the detection unit 12 is appropriately set by taking into consideration the processing ability of the support device 10, the color or the shape of the marker to be detected, and the like.

Figure 3:
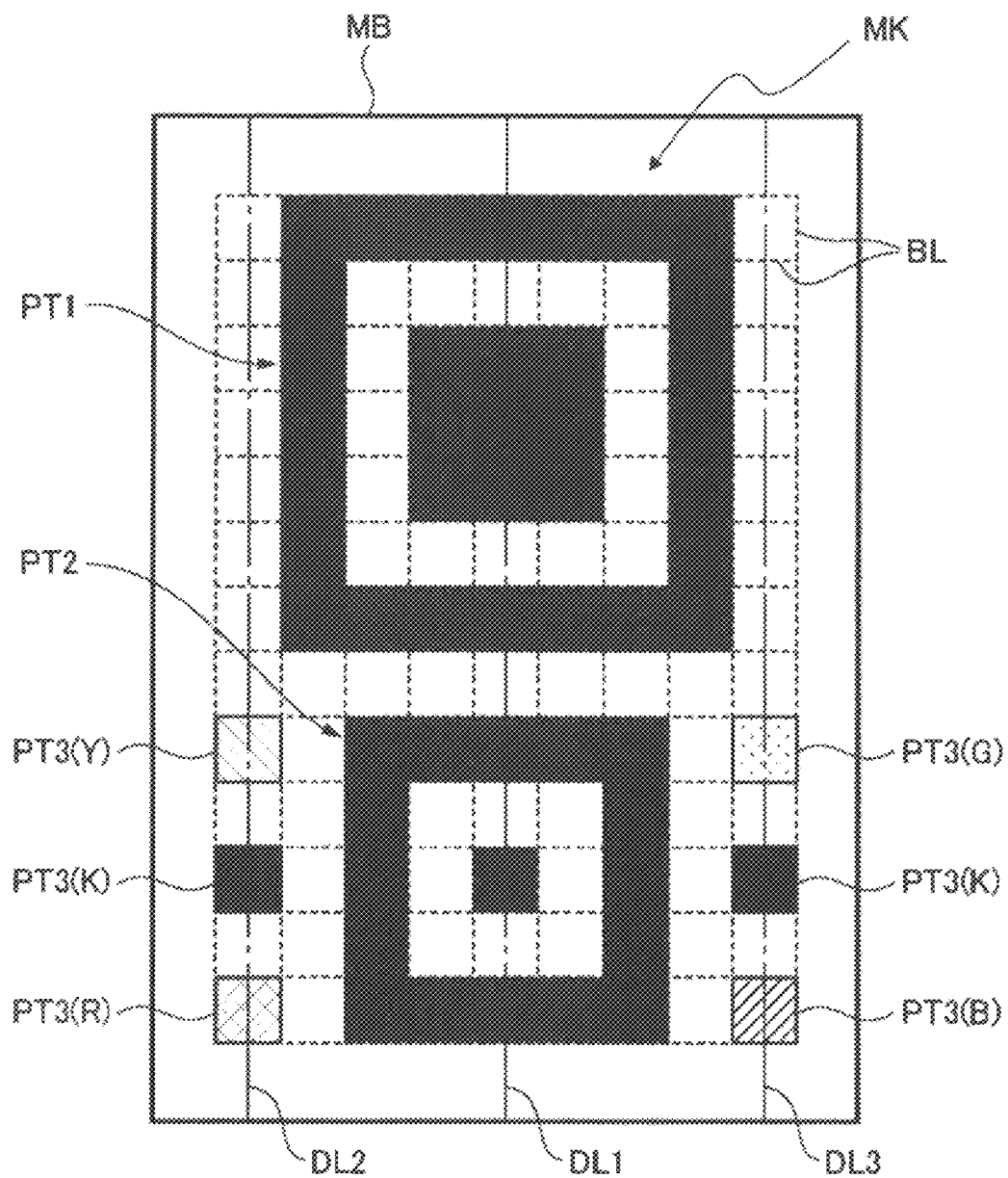
FIG. 3 is a diagram illustrating a specific example of a marker.

In this example, a specific example of the marker is described using FIG. 3. Note that the design of the marker illustrated in FIG. 3 is formed by using a square area defined by a dotted line BL as a unit, and by collecting dots, each of which is formed by coloring the square area. In the following, the design of the marker is also described as a dot pattern. Note that the dotted line BL, and one-dotted chain lines DL1, DL2, and DL3 illustrated in FIG. 3 are auxiliary lines illustrated for sake of convenience of explanation, and may not be actually displayed. Note that the dot pattern of the marker is not limited to the example illustrated in FIG. 3.

The marker MK illustrated in FIG. 3 is a design (the dot pattern) formed within an area of thirteen dots in a vertical direction and nine dots in a horizontal direction. The dot pattern as the marker MK is printed on a sheet MB. The area on the outside of the marker MK on the sheet MB is a margin of the sheet MB.

The marker MK includes dot patterns PT1 and PT2 of rectangular shapes (square shapes), whose sizes are different from each other, and a plurality of dot patterns PT3, each of which is constituted by one dot. In other words, the marker MK is a design formed by a plurality of dot patterns.

The dot patterns PT1 and PT2 are disposed away from each other along a straight line DL1 connecting a center point of the dot pattern PT1 and a center point of the dot pattern PT2. Further, the dot patterns PT1 and PT2 are constituted by a rectangular black frame pattern formed by black dots, a black rectangular pattern formed in a central portion of the black frame, and a white dot group formed between the black frame pattern and the black rectangular pattern.

The plurality of dot patterns PT3 have different colors from each other in this example. Specifically, on the marker MK, a green dot PT3(G), two black dots PT3(K), a blue dot PT3(B), a yellow dot PT3(Y), and a red dot PT3(R) are formed as the dot patterns PT3. These six dot patterns PT3 are divided into two groups, each of which is constituted by three dot patterns. One of the groups is such that the three dot patterns PT3(Y), PT3(K), and PT3(R) are arranged along a straight line DL2 in parallel to the straight line DL1 in a state that the centers thereof are aligned. The other of the groups is such that the three dot patterns PT3(G), PT3(K), and PT3(B) are arranged along a straight line DL3 in parallel to the straight line DL1 in a state that the centers thereof are aligned.

The storage unit 13 stores information on the marker MK as described above. The detection unit 12 detects the marker from an image with use of the information.

The environment acquisition unit 14 acquires recognition environment information based on image information of the marker detected by the detection unit 12. The recognition environment information is information representing an appearance of a target object to be recognized (an object to be detected (recognized) from the captured image) on the captured image by the camera 7. The recognition environment information includes, for instance, information such as the number of pixels (also described as a resolution) representing the target object to be recognized within an image, information relating to a degree of blur and brightness, hue information, and a tilt angle of the target object to be recognized with respect to a direction from the target object to be recognized toward the camera 7. Information relating to brightness includes a brightness balance, a contrast ratio, luminances of white and black, and the like. Note that the recognition environment information is not limited to these examples.

In this example, a relationship between the marker and the recognition environment information is described. Specifically, configuration conditions on the shape, the size or the like of the dot pattern constituting the marker are set based on the recognition environment information to be acquired. For instance, when the number of pixels (a resolution) representing the target object to be recognized within the image is acquired as the recognition environment information, the dot pattern which satisfies a constraint condition to be determined based on information on the minimum number of pixels by which a recognition engine can recognize the target object to be recognized is set as the marker. The information on the minimum number of pixels is, for instance, information on the minimum number of pixels in each of a vertical direction and a horizontal direction. Alternatively, the information on the minimum number of pixels may also be information representing combination of a ratio between the number of pixels in a vertical direction and the number of pixels in a horizontal direction, and the minimum number of pixels in a vertical direction or in a horizontal direction. A constraint condition based on information on the minimum number of pixels as described above is a condition indicating that the number of dots of the dot pattern in a vertical direction and in a horizontal direction does not exceed the minimum number of pixels in a vertical direction and in a horizontal direction, for example. Further alternatively, the constraint condition may also be a condition indicating that the number of dots of the dot pattern in a vertical direction or in a horizontal direction does not exceed the associated minimum number of pixels in a vertical direction or in a horizontal direction. The dot pattern of the marker is designed in such a manner as to satisfy the constraint condition as described above.

Figure 4:
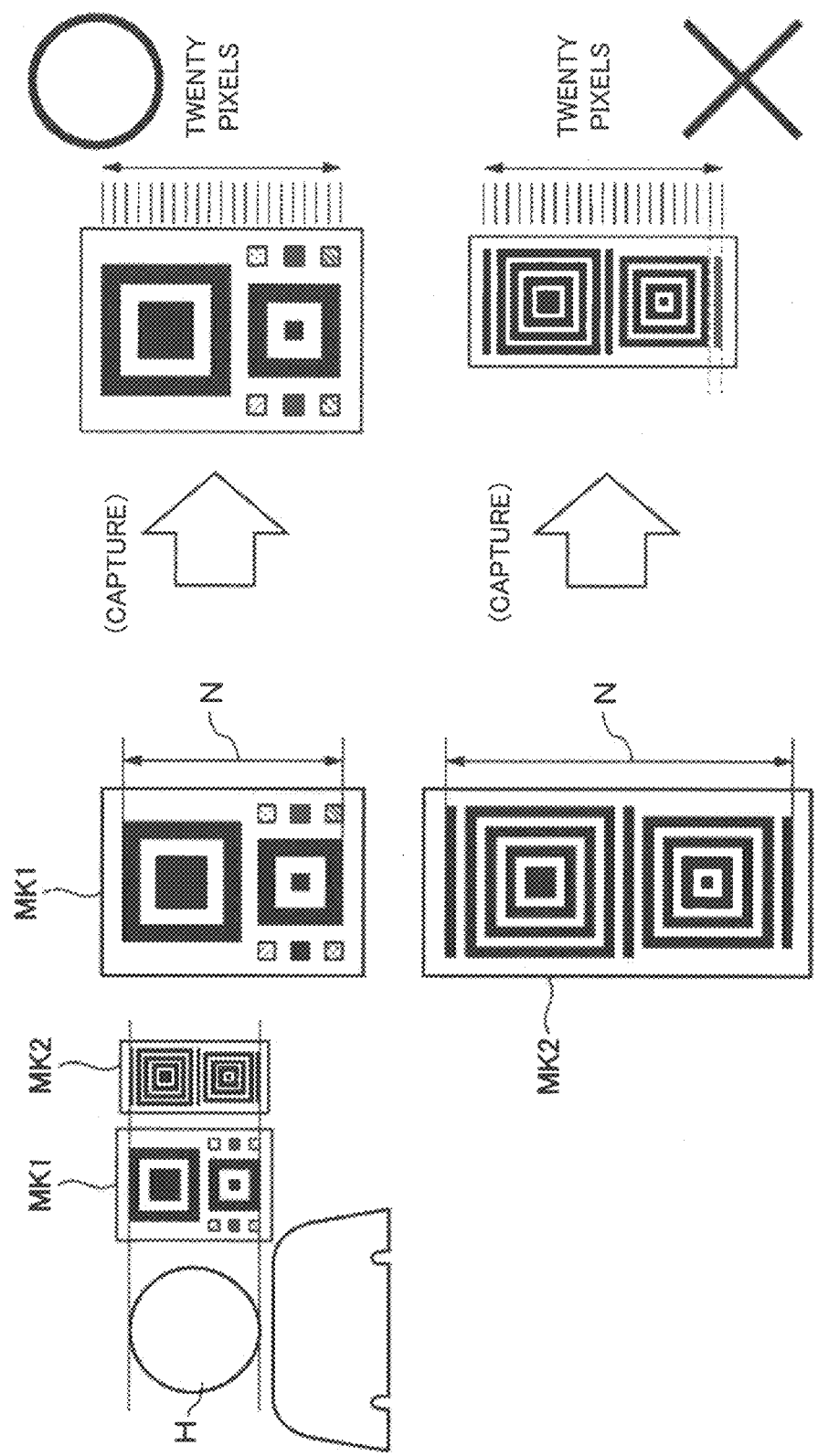
FIG. 4 is a diagram describing designing a dot pattern constituting the marker.

The reason for the above is described using a specific example as follows. FIG. 4 is a diagram describing a constraint condition based on the minimum number of pixels. In this specific example, the target object to be recognized is a head H of a person. It is assumed that the size of the marker is the same as the size of the target object to be recognized. Further, it is assumed that the minimum number of pixels in a vertical direction by which the support device 10 provided with a recognition engine can recognize the head H of a person is twenty pixels. In this case, it is necessary to satisfy the constraint condition indicating that the number of dots N of the marker (the dot pattern) in a vertical direction is less than twenty in order that the support device 10 recognizes the marker from the captured image by the camera 7 with use of the recognition engine, and acquires the recognition environment information.

In other words, in this example, it is assumed that the marker MK1 in FIG. 4 has the dot pattern in which the number of dots N in a vertical direction is thirteen. It is assumed that the marker MK2 has the dot pattern in which the number of dots N in a vertical direction is thirty-five. It is assumed that the markers MK1 and MK2 are displayed on the captured image by the camera 7 with a size of an image of twenty pixels or more. In this case, thirteen dots of the marker MK1 in a vertical direction are displayed on the captured image with a size of twenty pixels at a minimum. Therefore, the marker MK1 is displayed on the captured image by the camera 7 in a state that one dot has a size of one pixel or more. In this way, the marker MK1 is recognizable by the support device 10. On the other hand, thirty-five dots of the marker MK2 in a vertical direction are displayed on the captured image with a size of twenty pixels. Therefore, the marker MK2 is displayed on the captured image by the camera 7 in a state that one dot has a size smaller than one pixel. This makes it difficult for the support device 10 to recognize the marker MK2. Therefore, in this example, the dot pattern of the marker is set based on the constraint condition indicating that the number of dots N in a vertical direction is twenty or less.

Note that in a strict sense, the target objects to be recognized of the same species (e.g. heads of persons) have individual differences. Therefore, a general size may be used as the size of the target object to be recognized for use in determining the size of the marker.

Figure 5:
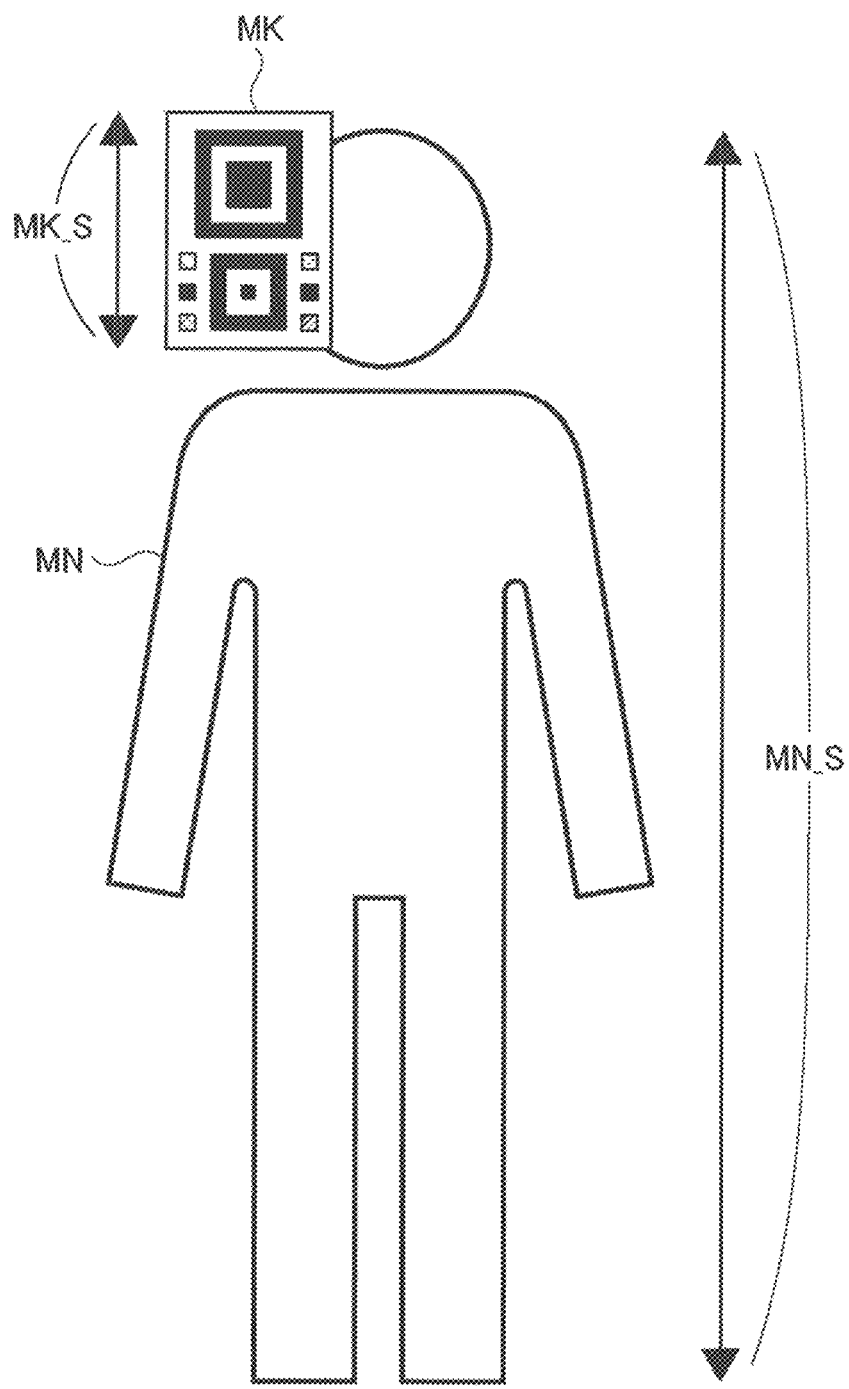
FIG. 5 is a diagram describing an example of a relationship between the size of the marker and the size of a target object to be recognized.

Further, the size of the marker may not be the same as the size of the target object to be recognized. FIG. 5 is a diagram illustrating another example of a relationship between the size of the marker and the size of the target object to be recognized. In the example illustrated in FIG. 5, the whole of a human (a person) MN is the target object to be recognized. The size of the marker MK is the same as the size of the head of a person. Further, it is assumed that the minimum number of pixels in a vertical direction by which the recognition engine can recognize the whole of the human MN is forty-two, and a ratio between the size MK_S of the marker MK, and the size MN_S of the whole of the human MN is set to 1:6. When the size of the marker MK is set to be the same as the size of the whole of the human MN, the dot pattern of the marker MK is set in such a manner that the number of dots in a vertical direction is forty-two or less. On the other hand, as illustrated in FIG. 5, when the ratio between the size MK_S of the marker MK and the size MN_S of the whole of the human MN is 1:6, the dot pattern of the marker MK is set in such a manner that the number of dots in a vertical direction is seven (=42/6) or less.

Information on the ratio between the size of the marker and the size of the target object to be recognized as described above may be stored in advance in the storage unit 13, for instance, or may be stored in the storage unit 13 by allowing a user to operate the input device 6 based on an input screen or the like to input the information to the support device 10. Further, the information on the size ratio may be stored in the storage unit 13 by causing the support device 10 to acquire the information from a portable storage medium, or from another computer or the like via the communication unit 4.

The environment acquisition unit 14 acquires the number of pixels of the target object to be recognized on the captured image by the camera 7 as the recognition environment information with use of the number of pixels included in the image area of the detected marker, for instance.

Note that in the examples illustrated in FIG. 4 and FIG. 5, the dot pattern is designed based on the constrain condition relating to the number of dots in a vertical direction, and the number of dots in a horizontal direction is not considered. In view of the above, for instance, the environment acquisition unit 14 acquires the number of pixels of the target object to be recognized in a vertical direction based on the number of pixels included in the image area of the detected marker in a vertical direction, as the recognition environment information.

As illustrated in the example of FIG. 4, when the size of the marker MK is the same as the size of the target object to be recognized, the environment acquisition unit 14 acquires the number of pixels included in the image area of the detected marker in a vertical direction, as the number of pixels of the target object to be recognized in a vertical direction (the recognition environment information). On the other hand, as illustrated in FIG. 5, the size of the marker may be different from the size of the target object to be recognized. In this case, the environment acquisition unit 14 converts the number of pixels included in the image area of the detected marker in a vertical direction into the number of pixels according to the size of the target object to be recognized with use of the ratio between the size of the maker and the size of the target object to be recognized. Then, the environment acquisition unit 14 acquires the number of pixels after conversion as the number of pixels of the target object to be recognized in a vertical direction (the recognition environment information).

Note that the constraint condition relating to designing the dot pattern may not only include the number of dots in a vertical direction but also include the number of dots in a horizontal direction. In this case, for instance, the environment acquisition unit 14 may acquire the number of pixels of the target object to be recognized both in a vertical direction and in a horizontal direction (i.e. the recognition environment information) based on the number of pixels included in the image area of the marker both in a vertical direction and in a horizontal direction. Further, the constraint condition relating to designing the dot pattern may not include the number of dots in a vertical direction but include the number of dots in) a horizontal direction. In this case, for instance, the environment acquisition unit 14 acquires the number of pixels of the target object to be recognized in a horizontal direction (i.e. the recognition environment information) based on the number of pixels included in the image area of the marker in a horizontal direction. In this way, the environment acquisition unit 14 acquires the number of pixels of the target object to be recognized in at least one of a vertical direction and a horizontal direction as the recognition environment information according to the constraint condition relating to designing the dot pattern.

When information relating to a degree of blur or brightness is acquired as the recognition environment information, it is desirable that the marker is formed by the dot pattern including a white dot group and a black dot group. The reason for this is that white and black have a large difference in luminance, and clearly represent information relating to the degree of blur and brightness for each environment. In this case, the environment acquisition unit 14 acquires the information relating to the degree of blur and the brightness at a position of the target object to be recognized on the captured image by the camera 7 as the recognition environment information based on the image information of the white dot and the black dot included in the detected marker.

For instance, the environment acquisition unit 14 acquires an edge intensity from a plurality of portions within the image where the black dot and the white dot are adjacent to each other. In order to acquire the edge intensity as described above, for instance, a Sobel filter, a Prewitt filter, or the like is used. The environment acquisition unit 14 calculates the degree of blur based on an average of edge intensities acquired as described above, and acquires the calculated degree of blur as the recognition environment information. Note that the environment acquisition unit 14 may calculate a ratio of the number of edge intensities which exceed a threshold value with respect to the total number of acquired edge intensities as the degree of blur, and may acquire the calculated degree of blur as the recognition environment information. As described above, various methods are proposed as a method for calculating the degree of blur. A method for calculating the degree of blur is not limited to the above.

The environment acquisition unit 14 is operable to calculate a brightness balance, a contrast ratio, and average luminances of white and black as information relating to the brightness based on the image of the marker. For instance, the environment acquisition unit 14 respectively calculates luminances for each the white dot and for each the black dot on an image of the marker, and calculates an average luminance of white and an average luminance of black.

Further, the environment acquisition unit 14 is operable to calculate a ratio between the average luminance of white and the average luminance of black on the image of the marker, as a contrast ratio. Further, the environment acquisition unit 14 calculates a sum of the average luminance (the average brightness) of white and the average luminance (the average brightness) of black on the image of the marker. It is assumed that the luminance (a brightness) in this example is indicated by using the numbers 0 to 255. It is assumed that the black whose luminance is smallest is "0", and the white whose luminance is largest is "255". In this case, the environment acquisition unit 14 is operable to calculate a numerical value obtained by subtracting "255" from a calculated sum of average luminances of white and black as the brightness balance. When it is clearly known that the black dot is black and the white dot is white, the brightness balance is zero or a value close to zero. When the image is too dark or too bright, the brightness balance has a plus value or a minus value according to the degree of brightness. Note that specific information relating to the brightness or a method for calculating the brightness are not limited to the aforementioned examples.

The environment acquisition unit 14 may acquire, as the recognition environment information, a tilt angle (hereinafter, also described as angle information of an target object to be recognized) of a pattern in a front direction (a direction normal to a plane where a pattern is formed (printed)) with respect to a direction from the target object to be recognized toward the camera 7. In this case, the marker has a shape of which information on a direction from a reference point set in an orthogonal coordinate system in a three-dimensional space toward the marker is acquirable, for instance. One of the markers (dot patterns) having the shape as described above is, for instance, the dot patterns PT1 and PT2 illustrated in FIG. 3. In other words, each of the dot patterns PT1 and PT2 has the rectangular shape in which each of the four vertexes has a right angle. Further, the dot patterns PT1 and PT2 are formed on a plane. For instance, the environment acquisition unit 14 calculates a homographic transformation matrix with use of a positional relationship between four vertexes of the dot pattern PT1 (or the dot pattern PT2)

within the captured image, and with use of an actual positional relationship between these four vertexes. Then, the environment acquisition unit 14 calculates the angle information of the target object to be recognized, with use of the homographic transformation matrix and with use of position information of the marker displayed within the captured image.

When the hue information is acquired as the recognition environment information, the marker is formed by the dot pattern including a red dot, a green dot, and a blue dot. In the example illustrated in FIG. 3, the marker includes, as the dot patterns PT3, a green dot PT3(G), a blue dot PT3(B), a yellow dot PT3(Y), and a red dot PT3(R). The environment acquisition unit 14 acquires the hue information of the captured image at a position of the target object to be recognized as the recognition environment information based on image information of the red dot, the green dot, and the blue dot included in the detected marker. Specifically, for instance, the environment acquisition unit 14 acquires an actual RGB value of the red dot, the green dot, and the blue bot included in the marker. Then, the environment acquisition unit 14 sets a deviation amount between the actual RGB value, and each RGB value included in the marker within the image as the hue information, and acquires the hue information as the recognition environment information. Note that a method for calculating the hue information is not limited.

As described above, the environment acquisition unit 14 is operable to acquire at least the number of pixels of the target object to be recognized, information relating to the degree of blur and the brightness, the angle information of the target object to be recognized, and the hue information on the captured image as the recognition environment information by using the dot pattern illustrated in FIG. 3. Note that the environment acquisition unit 14 may acquire pieces of the recognition environment information other than the above.

The display processing unit 15 has a function of controlling the display device 5. For instance, the display processing unit 15 causes the display device 5 to display the captured image on a screen of the display device 5 by transmitting the image acquired from the camera 7 with use of the image acquisition unit 11 to the display device 5. Concurrently, the display processing unit 15 causes the display device 5 to superimposedly display, on the screen of the display device 5, the recognition environment information on the captured image by transmitting the recognition environment information acquired by the environment acquisition unit 14 to the display device 5. The display position of the recognition environment information is set based on the disposed position of the marker on the captured image, for instance. For instance, the recognition environment information is displayed in such a manner that at least a part of the recognition environment information is superimposed on the image of the marker. Alternatively, the recognition environment information may be displayed at a vicinity position distanced from the image of the marker. As described above, it is possible to visually recognize a correlation between the marker and the recognition environment information by causing the display device 5 to superimposedly display the recognition environment information on the image of the marker, or display the recognition environment information in the vicinity of the image of the marker.

Note that the display processing unit 15 may also cause the display device 5 to display a lead line together with the captured image displayed on the display device 5 by transmitting information on the lead line for linking the image of the marker and displayed the recognition environment information to the display device 5. Further, the display processing unit 15 may also cause the display device 5 to display an identification number in the vicinity of the image of the marker, and to display the recognition environment information together with the identification number in an image area away from the image of the marker. Specifically, in this example, as far as it is possible to visually recognize that the marker and the recognition environment information acquired from the marker are associated with each other from a display image on the display device 5, the display position of the recognition environment information is not limited.

The display processing unit 15 may cause the display device 5 to display the recognition environment information by a color. For instance, the display processing unit 15 causes the display device 5 to display, on the screen of the display device 5, a mark of a color associated with a numerical value of the recognition environment information in a translucent manner. Further, when a plurality of markers are displayed on these captured image by the camera 7, the display processing unit 15 is operable to generate a map (a heat map) on an image representing the recognition environment information by causing the display device 5 to display the recognition environment information associated with each of the markers by a colored mark.

Figure 6:
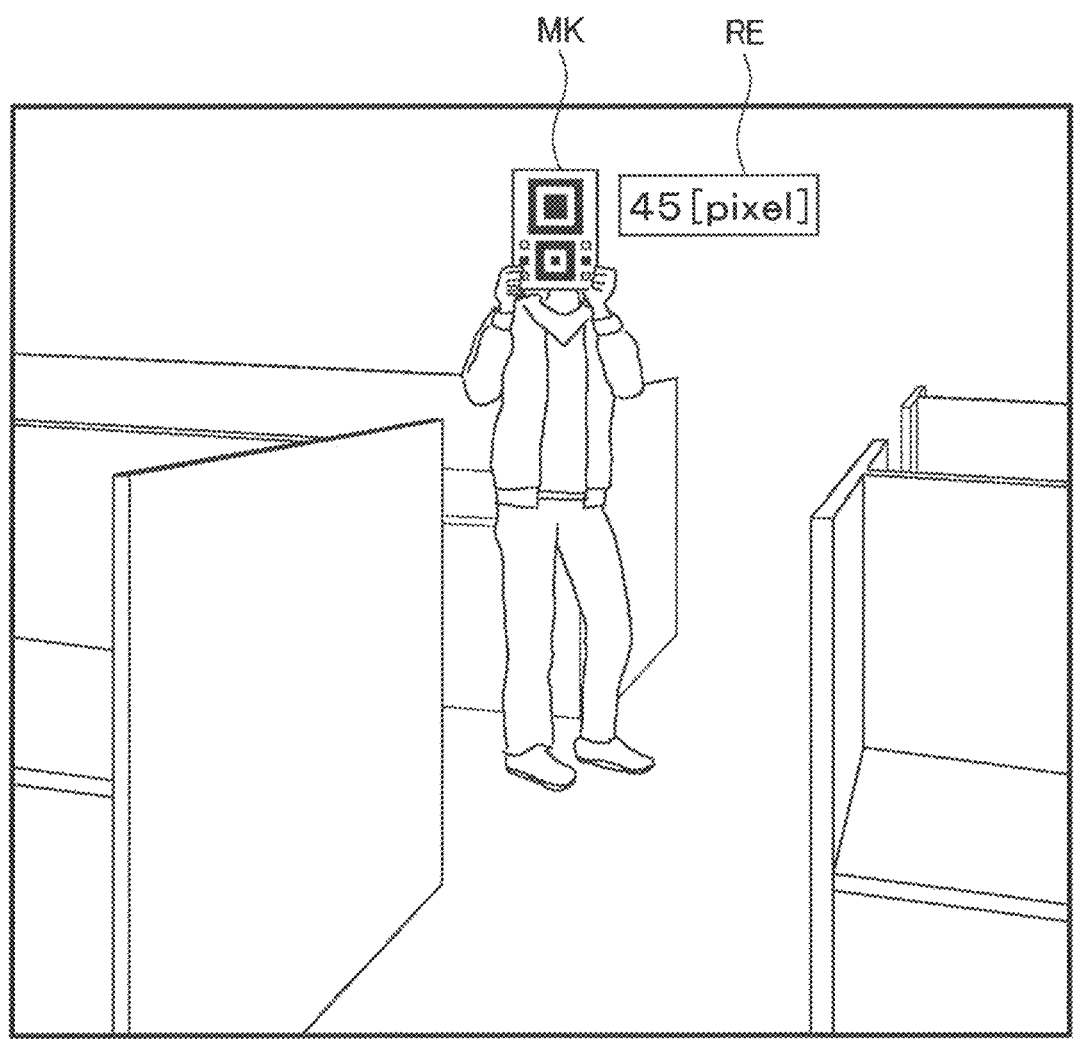
FIG. 6 is a diagram describing an example of a screen on which recognition environment information is displayed.

FIG. 6 is a diagram illustrating an example of a display screen on which the recognition environment information is superimposed. In the example illustrated in FIG. 6, the target object to be recognized is the head of a person, and the marker MK having the same size as the size of the head of the person is disposed at the same position as the head of the person. The number of pixels (forty-five pixels) of the target object to be recognized is superimposedly displayed in the vicinity of the marker MK as the recognition environment information RE. In the example illustrated in FIG. 6, a piece of the recognition environment information is displayed. However, a plurality of pieces of the recognition environment information may be displayed.

Further, the display processing unit 15 has a function of causing the display device 5 to display a quasi-image. The quasi-image is an image obtained by applying image processing to a model image of the target object to be recognized based on the recognition environment information acquired by the environment acquisition unit 14. The model image of the target object to be recognized is, for instance, an image stored in advance in the storage unit 13, and, for instance, is a photographic image of the target object to be recognized, a picture representing the target object to be recognized, a replica image such as a CG (Computer Graphics) image, or the like. The display processing unit 15 generates the quasi-image by applying image processing in such a manner as to clearly display how the model image looks like (is captured) when acquired the recognition environment information is applied to the model image. All the acquired pieces of the recognition environment information may be applied to the quasi-image, or a part of the recognition environment information may be applied to the quasi-image. Causing the display device 5 to display a quasi-image as described above by the display processing unit 15 allows for the support device 10 to present an operator (a user) with the recognition environment information in an easily recognizable state. Note that the display processing unit 15 is operable to display the quasi-image in an easily recognizable manner by causing the display device 5 to display the quasi-image with a fixed size regardless of the size of the target object to be recognized on the captured image.

Figure 7:
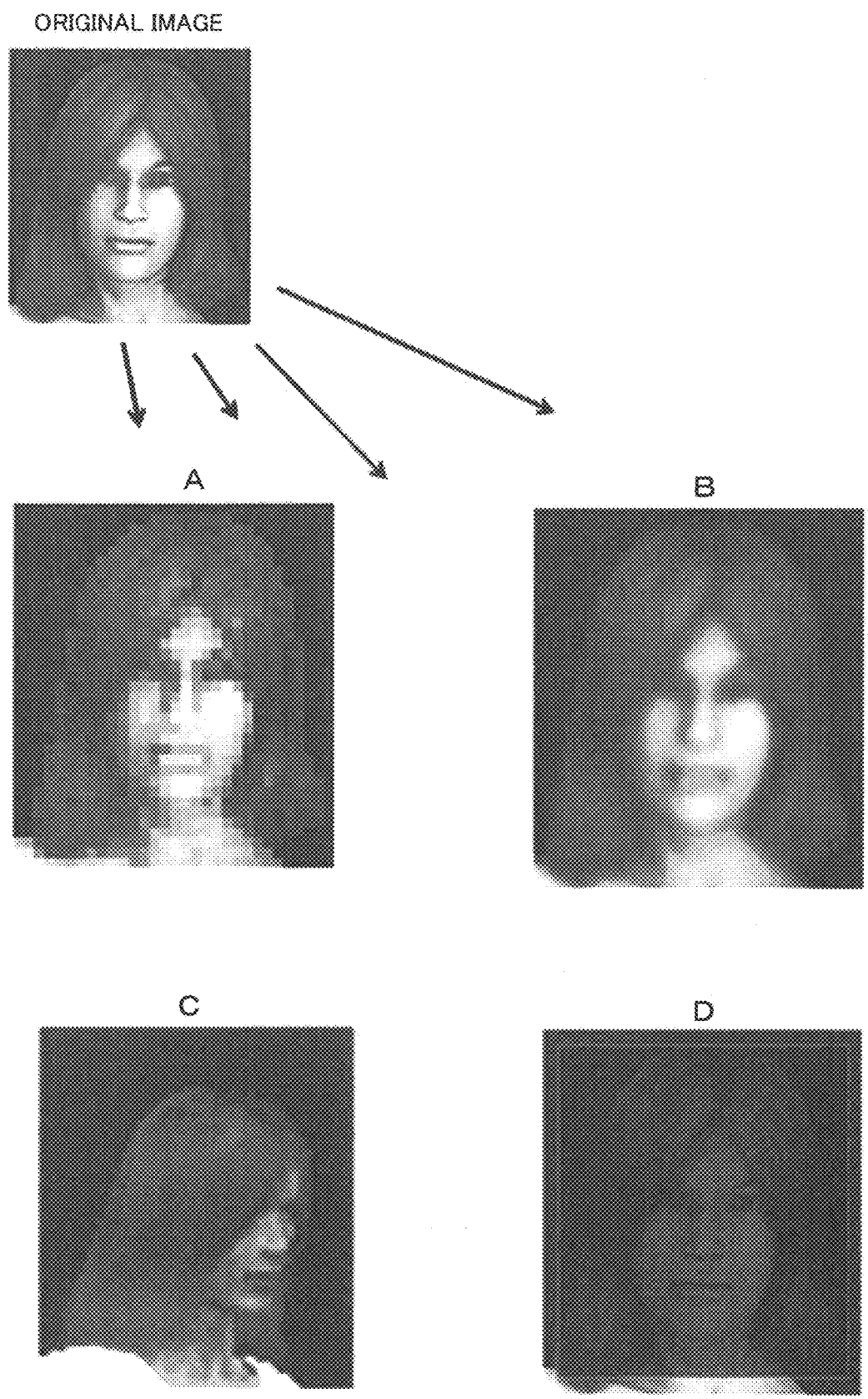
FIG. 7 is a diagram illustrating an example of a quasi-image.

FIG. 7 is a diagram illustrating a specific example of the quasi-image. In the example illustrated in FIG. 7, the target object to be recognized is the head of a person. A CG image representing the head of the person is the model image of the target object to be recognized (in FIG. 7, described as an original image). The display processing unit 15 generates the quasi-image by applying image processing to the model image based on the recognition environment information.

For instance, the display processing unit 15 applies, to the model image, image processing of lowering the resolution (the number of pixels) of the model image to the resolution (the number of pixels) of the target object to be recognized acquired as the recognition environment information in a state that the image size of the model image is unchanged. By performing image processing as described above, the quasi-image as represented by an image A in FIG. 7 is generated.

Further, the display processing unit 15 applies, to the model image, image processing of forming the model image to have the degree of blur acquired as the recognition environment information. By performing the image processing as described above, the quasi-image as represented by an image B in FIG. 7 is generated. Further, the display processing unit 15 applies, to the model image, image processing of turning the model image (the image of the head) by an angle corresponding to the target object to be recognized acquired as the recognition environment information. By performing the image processing as described above, the quasi-image as represented by an image C in FIG. 7 is generated. Further, the display processing unit 15 applies, to the model image, image processing of changing a contrast of the model image according to a contrast ratio acquired as the recognition environment information. By performing the image processing as described above, the quasi-image as represented by an image D in FIG. 7 is generated. Various methods are proposed regarding image processing to be applied to the model image as described above, and an appropriate method is employed.

The data generation unit 16 has a function of generating printing data indicating printing the marker on the sheet. The storage unit 13 stores image information of the marker. The data generation unit 16 extracts image information of the marker from the storage unit 13, and generates printing data based on the image information. The printing data may also be a data file with which an application such as a word processor software or a slide creation software is allowed to print the image of the marker. Further, the printing data may be own data without use of the application as described above. As illustrated in the examples of FIG. 4 and FIG. 5, when the size of the marker is set to be the same as the size of the head of the person, the data generation unit 16 generates printing data indicating printing the marker on an A4-size longitudinal sheet, for example.

—Operation Example/Recognition Support Method—

In the following, a recognition support method in the first example embodiment is described using FIG. 8 and FIG. 9.

Figure 8:
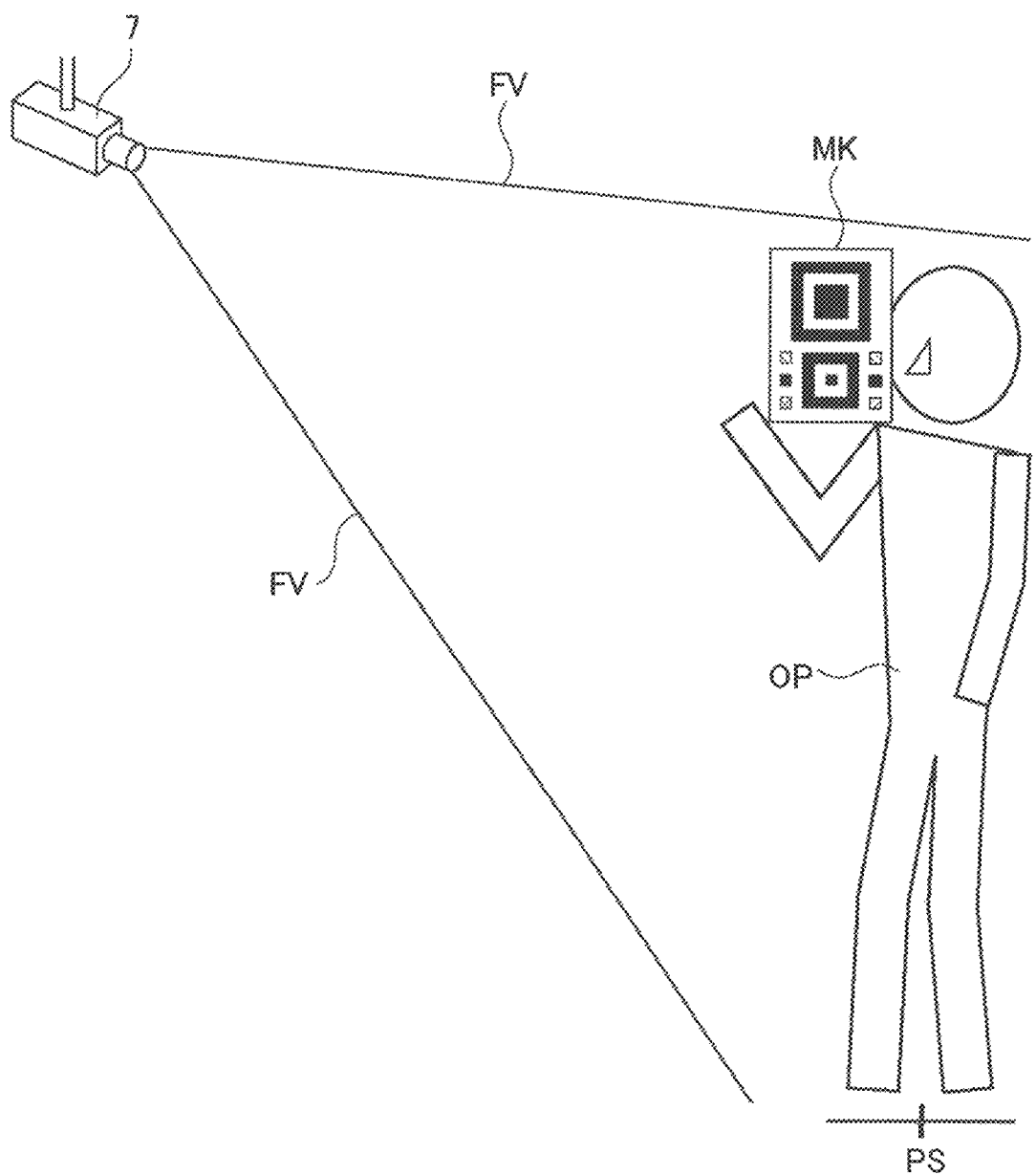
FIG. 8 is a diagram describing a use example of the marker.

FIG. 8 is a diagram illustrating a use example of the marker. FIG. 9 is a flowchart illustrating an operation example of the support device 10 in the first example embodiment. The flowchart illustrates an example of a processing procedure of a computer program to be executed by the CPU 1 of the support device 10.

Before the support device 10 performs the following operation, as illustrated in FIG. 8, the camera 7 included in a recognition system is installed at an installation place based on a specifications. Further, the marker MK is prepared by taking into consideration the size of the target object to be recognized, the recognition precision of a recognition engine, and the like. In the example illustrated in FIG. 8, the target object to be recognized is the head of a person, and the marker MK has the same size as the size of the head of the person. An operator OP stays in a place within an object recognition area to be recognized by the recognition system, while holding the marker MK at a height position of the head as the target object to be recognized. Specifically, the operator OP repeats an action of moving and stopping within the object recognition area of the recognition system, while holding the marker MK so as to check the difference in the recognition environment by a place within the object recognition area of the recognition system. The camera 7 continuously or intermittently captures the action of the operator OP within a field of view FV.

The support device 10 acquires the image (a moving image or a still image) by causing the image acquisition unit 11 to capture a video image signal representing the captured image from the camera 7 (S81). Note that the video image signal from the camera 7 may be directly transmitted to the support device 10, or may be transmitted via an information communication network or a storage device such as a portable storage medium.

The detection unit 12 of the support device 10 detects the marker from the acquired image (S82).

The environment acquisition unit 14 of the support device 10 acquires the recognition environment information of the target object to be recognized (the head of the person) at a position PS within the field of view FV of the camera 7 based on the image of the detected marker (S83). In other words, the environment acquisition unit 14 of the support device 10 acquires the number of pixels (a resolution) representing the target object to be recognized, information relating to the degree of blur and the brightness, the hue information, the angle of the target object to be recognized, and the like, as the recognition environment information, for example.

The display processing unit 15 of the support device 10 causes the display device 5 to display, on the screen of the display device 5, the image in which the recognition environment information acquired by the environment acquisition unit 14 is superimposed on the captured image of the camera 7 (S84). The recognition environment information to be displayed is all or a part of the acquired pieces of the recognition environment information.

Further, the display processing unit 15 of the support device 10 generates the quasi-image representing the appearance of the target object to be recognized by applying image processing to the model image with use of the recognition environment information acquired by the environment acquisition unit 14, and causes the display device 5 to display the quasi-image (S85).

Figure 10:
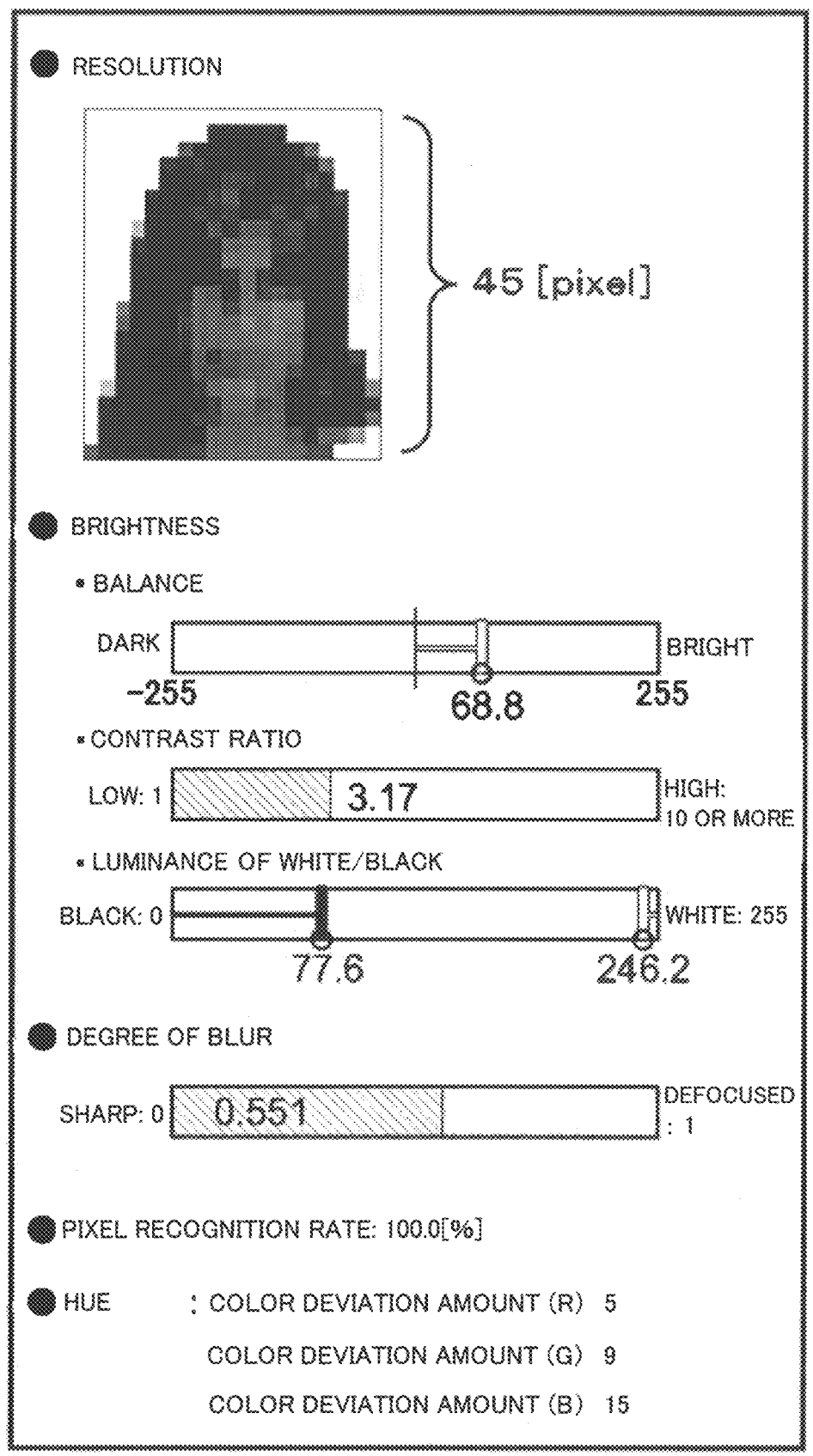
FIG. 10 is a diagram illustrating a display example (including a quasi-image) of the recognition environment information.

FIG. 10 is a diagram illustrating a display example of the recognition environment information. In the example illustrated in FIG. 10, the number of pixels (a resolution) of the target object to be recognized is displayed by the numeral value and the quasi-image. The brightness balance, the contrast ratio, and the luminances (brightnesses) of white and black are displayed as information on the brightness, and these parameters are displayed by a numeral value and a graph.

In the example illustrated in FIG. 10, the average luminance of black is calculated to be "77.6", and the average luminance of white is calculated to be "246.2". The brightness balance is calculated by subtracting "255" from a sum of the average luminance "77.6" of black and the average luminance "246.2" of white so that a lowest value becomes "−255" and a highest value becomes "255". The calculated value "68.8" is displayed on the screen of the display device 5 as the balance. Further, the contrast ratio is calculated by obtaining the ratio of the average luminance of white with respect to the average luminance of black, and is displayed to be "3.17". The degree of blur is calculated based on an average of edge intensities of a plurality of portions on the dot pattern of the marker where the black dot and the white dot are adjacent to each other. In this example, the degree of blur is calculated by normalizing the average of the edge intensities to a numerical value from 0 to 1, and by subtracting a normalized numerical value from the numerical value "1" so that the numerical value "1" indicates that an image is defocused. In the example illustrated in FIG. 10, the degree of blur is displayed to be "0.551".

The hue information is obtained by respectively calculating the deviation amount from the true RGB value of the marker for each of a red color, a green color, and a blue color on the recognized marker, and the deviation amounts are respectively displayed by a numerical value (an RGB value).

The support device 10 acquires (detects) the recognition environment information based on the captured image of the camera 7 as described above, and displays the acquired the recognition environment information. Note that a method for detecting the recognition environment information is not limited to the aforementioned method. Further, a method for displaying the recognition environment information is not limited to the example illustrated in FIG. 10. Further, in FIG. 9, the processes (steps) S81 to S85 are illustrated in this order. However, some of the processes may be performed concurrently, or the order of the processes may be different. For instance, the process S84 and the process S85 may be performed concurrently. Further, the process S84 and the process S85 may be performed in the opposite order. Furthermore, one of the process S84 and the process S85 may be omitted.

Advantageous Effects of First Example Embodiment

As described above, the support device 10 of the first example embodiment detects the marker from the image captured by the camera 7, and acquires the recognition environment information within the object recognition area by the recognition system based on the image of the detected marker. The recognition environment information is information representing the appearance of the target object to be recognized on the captured image by the camera 7, and is information on the performance of the camera 7, the brightness within the object recognition area, and the like, which may affect the recognition precision of a recognition engine.

In other words, the support device 10 of the first example embodiment is operable to acquire the recognition environment information within the object recognition area by performing a simplified operation of holding the marker within the object recognition area of the recognition system, without using the recognition engine. Further, the support device 10 is operable to acquire detailed the recognition environment information such as a resolution of the target object to be recognized, information on the brightness and the degree of blur, and the hue information. Therefore, the support device 10 is operable to perform appropriate prior evaluation of the recognition engine of the recognition system before the recognition system is configured. Further, the support device 10 is operable to adjust the number of cameras 7 constituting the recognition system, an installation position and an orientation of the camera 7; and parameters such as a shutter speed, an aperture, or white balance of the camera 7 by checking the recognition environment information. This makes it possible to reduce an adjustment operation after the recognition system is configured, and to smoothly deliver the recognition system.

Further, the size of the marker or a way of use (a way of holding) of the marker is set based on the size or the height position of the target object to be recognized. Further, the shape or the color of the dot pattern constituting the marker is set based on the content of required the recognition environment information, or the minimum number of pixels by which the recognition engine can recognize the target object to be recognized. In this way, the configuration of the marker for use is settable generically. Therefore, the support device 10 is applicable to acquisition of the recognition environment information in various systems using image recognition.

Note that in the aforementioned description, the target object to be recognized is a person. However, the target object to be recognized is not limited to a person, but a vehicle, a product, an animal, a character or a symbol may be applied. Further, a recognition algorithm of the recognition engine, a recognition method, and the like are also not limited.

Further, the support device 10 of the first example embodiment is operable to cause the display device 5 to display the image by superimposing the recognition environment information on the captured image by the camera 7 in a state that the correlation between the marker detected from the captured image by the camera 7 and the recognition environment information acquired from the marker is visually recognizable. The support device 10 having the aforementioned configuration allows for the operator to easily grasp at which position on the captured image by the camera 7, acquired the recognition environment information is located. Further, the captured image of the camera 7 to be displayed on the display device 5 may be a real-time video image. In this case, the support device 10 allows for the operator to easily grasp the correlation between the marker and the recognition environment information by displaying the recognition environment information acquired from the real-time video image (an image) on the image on a real-time basis.

Further, the support device 10 is operable to generate the quasi-image by applying the image processing to the model image of the target object to be recognized with use of acquired the recognition environment information, and to cause the display device 5 to display the quasi-image generated. The support device 10 having the aforementioned configuration makes it possible to display the actual appearance of the target object to be recognized in an easily recognizable manner by the quasi-image. In other words, the support device 10 allows for the operator to intuitionally grasp the recognition environment information through the eyes.

Second Example Embodiment

In the following, the second example embodiment according to the present invention is described. Note that in the description of the second example embodiment, the same constituent portions as those of the first example embodiment are indicated with the same reference numerals, and repeated description on the common portions is omitted.

In the second example embodiment, the support device 10 has a function of acquiring a relative position of the marker to a position of the camera 7 as a reference from the captured image by the camera 7, and causing the display device 5 to display the relative position and the recognition environment information in association with each other. In the following, the details of the second example embodiment are described.

—Processing Configuration—

Figure 11:
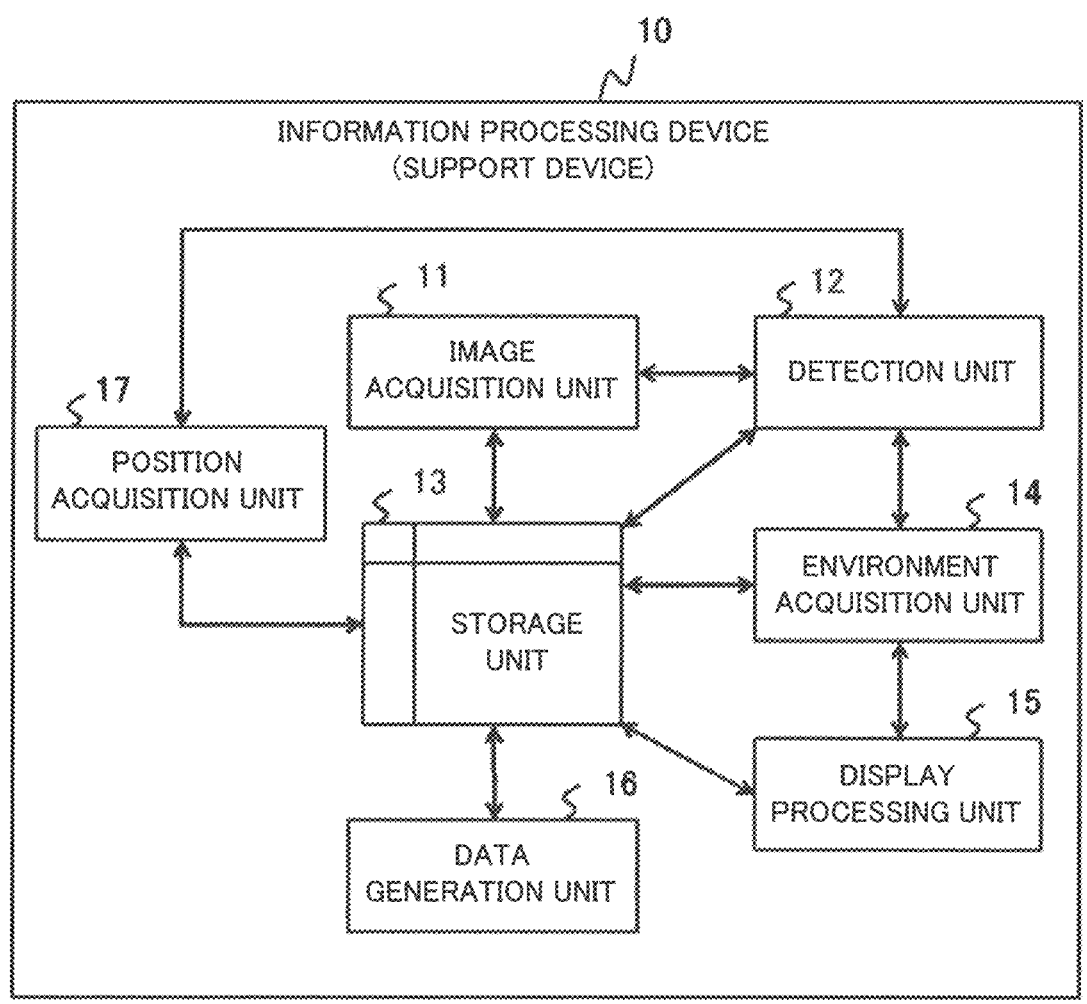
FIG. 11 is a block diagram conceptually illustrating a control configuration of an information processing device (a support device) in a second example embodiment.

FIG. 11 is a block diagram conceptually illustrating a control configuration of the support device (an information processing device) 10 of the second example embodiment. Note that in FIG. 11, directions of arrows in the drawing illustrate an example, and do not limit the directions of signals between blocks.

The support device 10 of the second example embodiment further includes a position acquisition unit 17 in addition to the configuration of the first example embodiment. The position acquisition unit 17 is also implemented by the CPU 1, for instance.

The position acquisition unit 17 acquires position information representing a relative position of the marker to the position of the camera 7 as a reference. In other words, the position acquisition unit 17 is operable to calculate relative position information of the marker based on the image information of the marker detected by the detection unit 12, the height information of the marker, and parameters of the camera 7. The height information of the marker is information representing a height from a floor surface to a held marker. For instance, a height (a length) from a floor surface to a center point of the marker is the height information of the marker. The storage unit 13 may store in advance the height information as described above. Alternatively, for instance, the height information input by an operation of an operator (a user) with use of the input device 6 may be stored. Parameters of the camera 7 are information representing the position of the camera 7, a posture of the camera 7 (an orientation of a lens), and the like. The storage unit 13 may store the parameters in advance, or may store parameters acquired from the camera 7 by communication. Further, the storage unit 13 may store parameters of the camera input by an operator's operation with use of the input device 6.

The position acquisition unit 17 acquires a central coordinate of the marker based on the image of the detected marker. Then, the position acquisition unit 17 calculates position information on three-dimensional coordinates, which represents the relative position of the marker to the position of the camera 7 as a reference by plane projective transformation, for instance, with use of the central coordinate, the height information of the marker, and parameters of the camera. Alternatively, the position acquisition unit 17 may project position information on three-dimensional coordinates calculated as described above on a two-dimensional plane in parallel to a floor surface, and may set the position information on the two-dimensional plane as the relative position information of the marker.

Further, the position acquisition unit 17 is also operable to acquire the relative position information of the marker by another method. For instance, the position acquisition unit 17 is also operable to acquire the position information by an operator's input operation with use of the input device 6. For instance, the position acquisition unit 17 causes the display device 5 to display a list, in which the recognition environment information stored in the storage unit 13, and an image from which the recognition environment information is extracted are associated with each other. Then, the position acquisition unit 17 allows for the operator to input the relative position information of the marker associated with the recognition environment information with use of the input device 6. In this case, the height information of the marker and the parameter information of the camera are not used in order to obtain the relative position information of the marker. Therefore, it is not necessary to acquire the height information of the marker and the parameter information of the camera.

The storage unit 13 stores the relative position information of the marker acquired (calculated) as described above in a state that the relative position information is associated with the recognition environment information acquired from the image of the marker. In other words, the storage unit 13 stores the recognition environment information together with the relative position information of the marker.

The display processing unit 15 maps the position of the marker (the relative position of the marker to the position of the camera 7 as a reference) on the screen (also described as the map screen) of the display device 5 on which two-dimensional or three-dimensional coordinates are displayed with respect to the position of the camera 7 as a reference. Further, the display processing unit 15 displays the recognition environment information associated with the marker in association with the mapped position of the marker. In other words, the display processing unit 15 displays how the recognition environment information differs depending on the position of the camera 7 as a reference. Note that each of position information of the marker to be displayed and the recognition environment information may be all or a part of the acquired pieces of information.

Figure 12:
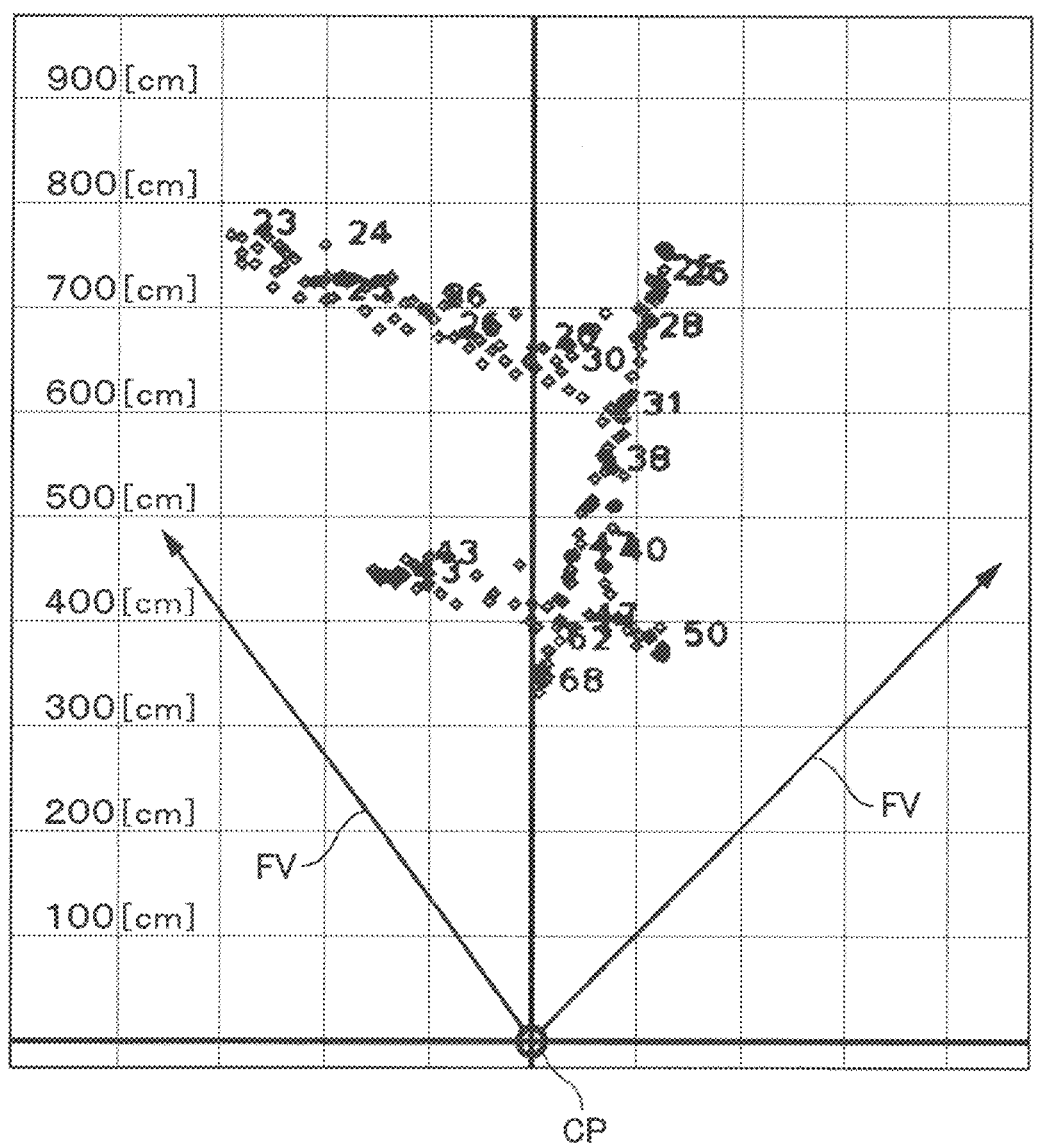
FIG. 12 is a diagram illustrating a display example of a map screen.

FIG. 12 is a diagram illustrating a display example of the map screen. In the example illustrated in FIG. 12, the position of the marker is plotted by points on a graph of two-dimensional coordinates on the plane in parallel to the floor surface. Then, the recognition environment information associated with the position of the marker (in this example, the number of pixels (a resolution) of the target object to be recognized) is displayed by the numerical value in the vicinity of the point representing the position of the marker. Further, in the example illustrated in FIG. 12, the position CP and the field of view FV of the camera 7 are displayed. Note that FIG. 12 illustrates an example, and one or both of the position CP and the field of view FV of the camera 7 may not be displayed. Further, in the example illustrated in FIG. 12, the position of the marker is indicated by a point, and the recognition environment information is represented by a numerical value. In place of this, the recognition environment information may be displayed by heat map display, in which the position of the marker associated with the recognition environment information is colored with a color associated with a numerical value of the recognition environment information.

—Operation Example/Recognition Support Method—

Figure 13:
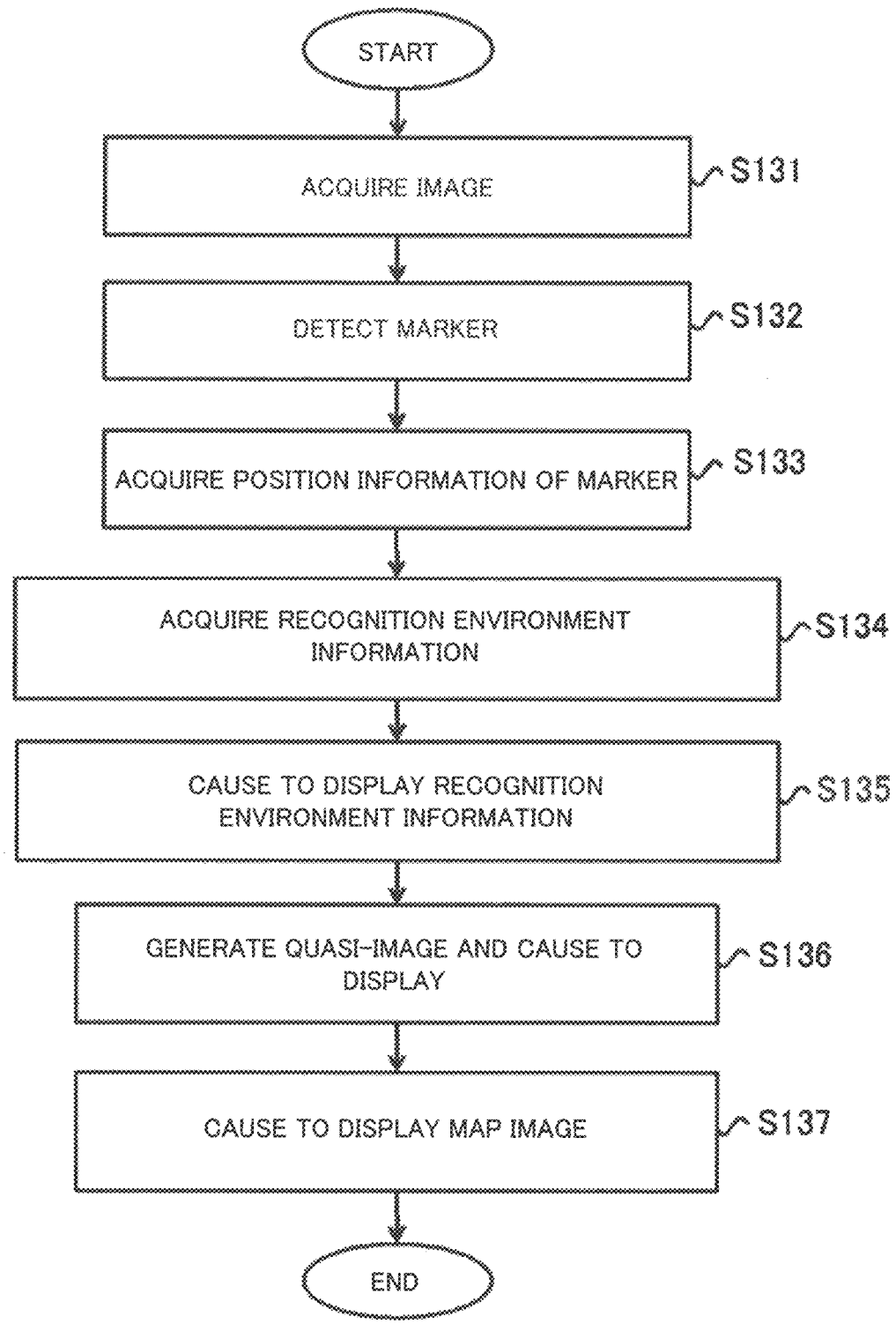
FIG. 13 is a flowchart illustrating an operation example of the support device in the second example embodiment.

In the following, an operation example of the support device 10 of the second example embodiment is described using FIG. 13. FIG. 13 is a flowchart illustrating an operation example of the support device 10 in the second example embodiment. The flowchart illustrates a processing procedure to be executed by the CPU 1 of the support device 10.

Figure 9:
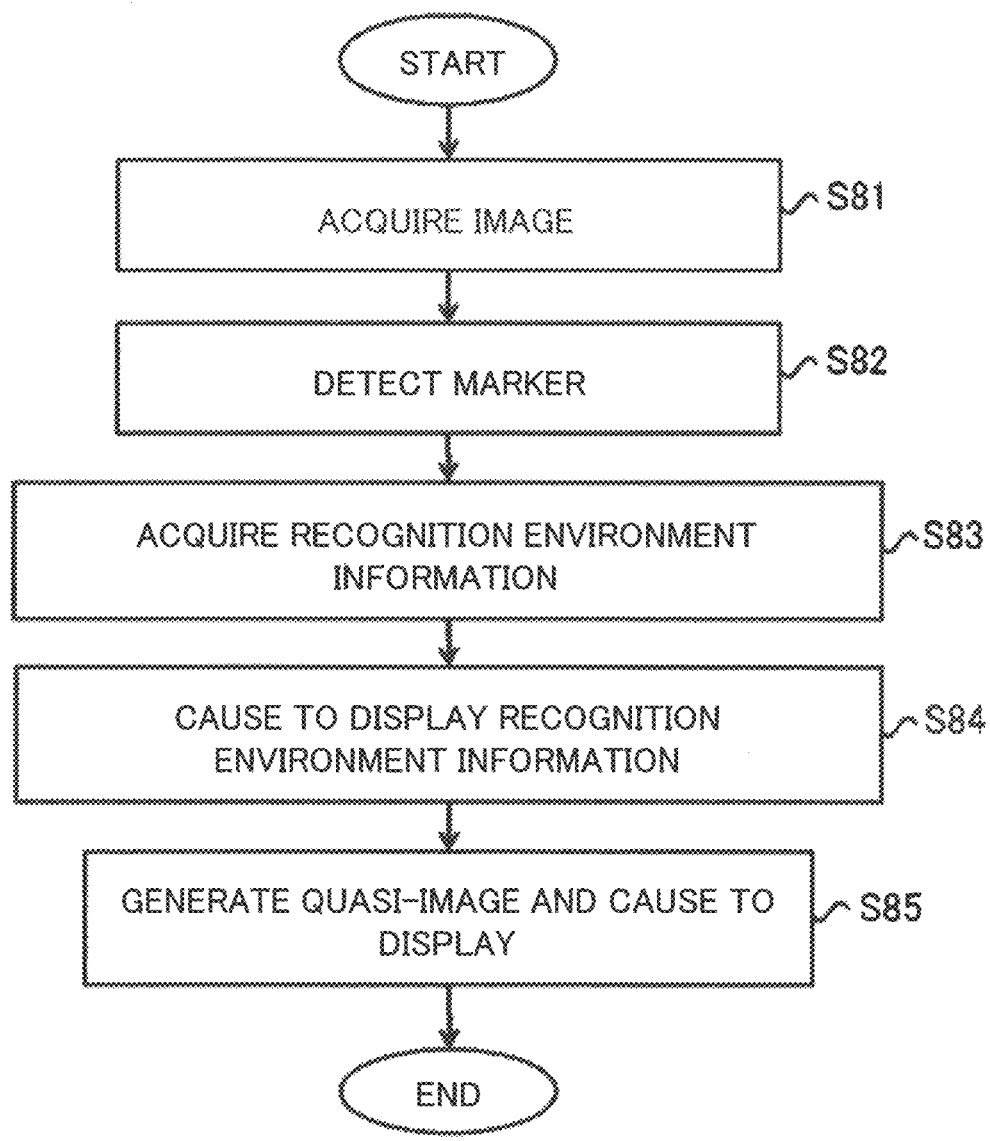
FIG. 9 is a flowchart illustrating an operation example of the support device in the first example embodiment.

Processes S131, S132, S134, S135, and S136 in FIG. 13 are the same as the processes S81, S82, S83, S84, and S85 in FIG. 9, and description thereof is omitted.

In the process S133, the position acquisition unit 17 of the support device 10 acquires the position information of the marker based on the image information of the marker detected by the detection unit 12, the height information of the marker, and the parameters of the camera 7 (such as the position of the camera 7 or the orientation of the lens). The position information of the marker to be acquired is the information representing the relative position of the marker to the position of the camera 7 as a reference.

In the process S137, the display processing unit 15 of the support device 10 causes the display device 5 to display the map screen based on the correlation between the position information acquired by the position acquisition unit 17, and the recognition environment information acquired by the environment acquisition unit 14. The three-dimensional coordinates or two-dimensional coordinates are displayed on the map screen.

Note that in FIG. 13, a plurality of processes (steps) are illustrated in a certain order. However, processes to be performed in the second example embodiment and the order of performing the processes are not limited to the example illustrated in FIG. 13. For instance, the processes S135, S136, and S137 may be performed concurrently, or may be performed in the order other than the above. Further, one or two of the processes S135, S136, and S137 may be omitted.

Advantageous Effects of Second Example Embodiment

As described above, the support device 10 of the second example embodiment is operable to display the map screen on which the recognition environment information is displayed (mapped) at the position of the marker associated with the recognition environment information.

Therefore, the support device 10 of the second example embodiment allows for the operator to easily grasp the positional relationship of the recognition environment information to the camera 7, and to clearly understand a recognizable area to the camera as a reference.

Modification Examples

Note that the support device 10 may include a configuration, in which time change information is added to the recognition environment information, in addition to the configuration of the first or second example embodiment. For instance, an operator may hold the marker at the same position at different times, or fixedly install the marker. According to this configuration, an environment acquisition unit 14 respectively acquires the recognition environment information at each time (at each point of time or at each date and time) based on the image of the marker at the same position for the images captured at different times. In this case, the storage unit 13 stores the captured time of the image of the marker. Further, the captured time of the image of the marker as a reference is associated with the recognition environment information to be stored in the storage unit 13. Further, the display processing unit 15 may also cause the display device 5 to display the captured time of the image of the marker as a reference when the recognition environment information is displayed on the display device 5. In this way, presenting a time change of the recognition environment at the same position allows for the support device 10 to acquire information on a change in the recognition environment with time accompanied by a change in external light such as sunlight or a shade with time.

Third Example Embodiment

In the following, the third example embodiment according to the present invention is described.

Figure 14:
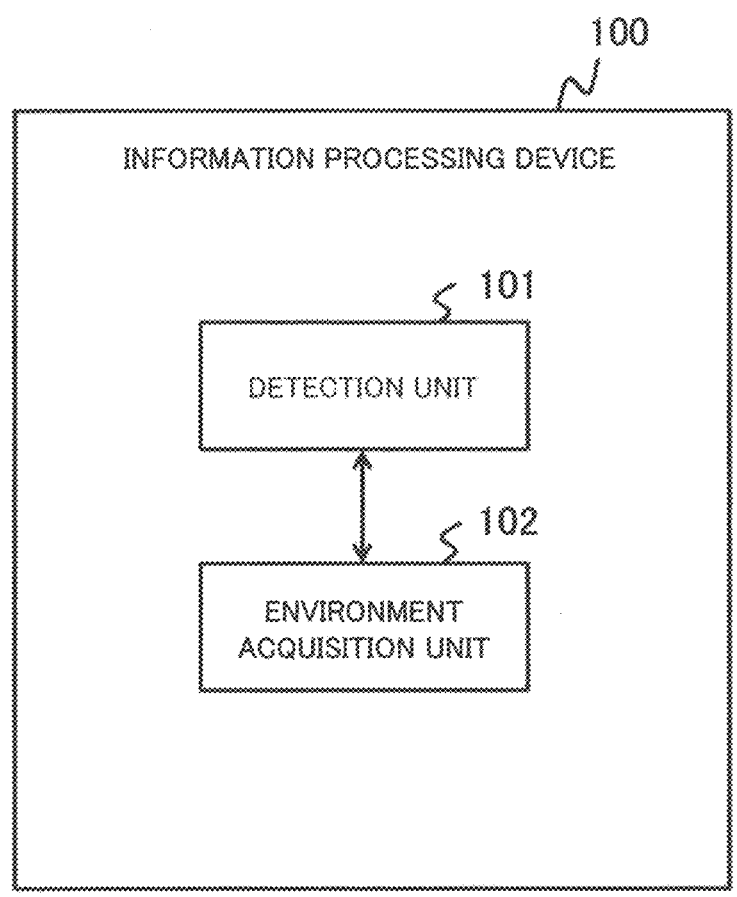
FIG. 14 is a block diagram conceptually illustrating a control configuration of an information processing device in a third example embodiment.

FIG. 14 is a block diagram conceptually illustrating a control configuration of an information processing device in the third example embodiment. Note that in FIG. 14, directions of arrows in the drawing indicate an example, and do not limit the directions of signals between blocks.

An information processing device 100 of the third example embodiment includes a detection unit 101 and an environment acquisition unit 102. The information processing device 100 has a hardware configuration (see FIG. 1), which is the same as the support device 10 in the first or second example embodiment, for example. The detection unit 101 and the environment acquisition unit 102 are implemented by causing the CPU 1 to execute a computer program, for instance. Note that a the camera 7, the display device 5, and the input device 6 may not be connected to the information processing device 100.

The detection unit 101 has a function of detecting image information of the marker from the captured image by an imaging device (the camera 7) by image processing, for instance. The captured image (moving image data or still image data) may be directly input from the camera 7 to the information processing device 100, or may be input to the information processing device 100 via another device or a portable storage medium.

The environment acquisition unit 102 has a function of acquiring the recognition environment information based on the image information of the marker detected by the detection unit 101. The recognition environment information is information representing in what state the target object to be recognized is captured when the target object to be recognized located at the position of the marker is captured by the imaging device. For instance, the recognition environment information is various pieces of information described in the first or second example embodiment.

Figure 15:
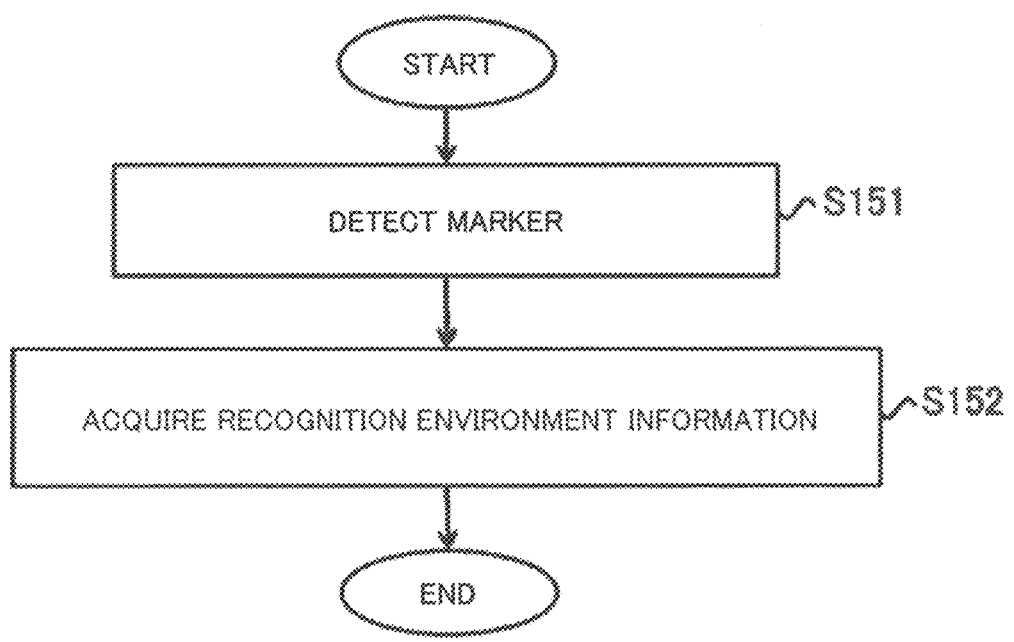
FIG. 15 is a flowchart illustrating an operation example of the information processing device in the third example embodiment.

FIG. 15 is a flowchart illustrating an operation example of the information processing device 100 in the third example embodiment. Note that the flowchart illustrates an example of a processing procedure of a computer program to be executed by the CPU 1 of the information processing device 100.

For instance, the information processing device 100 (the detection unit 101) detects the image information of the marker from the captured image by the imaging device (S151). Then, the information processing device 100 (the environment acquisition unit 102) acquires the recognition environment information based on the image information of the detected marker (S152).

Note that the information processing device 100 is operable to cause a display device to display acquired the recognition environment information on a screen of the display device by the same method as in the first or second example embodiment. Further, the information processing device 100 may cause a printing device to print acquired the recognition environment information, or may cause a storage device such as a portable storage medium to store the recognition environment information as a file. Further, the information processing device 100 may transmit the acquired the recognition environment information to another computer by communication. In this way, when the recognition environment information is output (displayed, printed, or displayed), an image as an extraction source may be associated with the recognition environment information. Further, position information of the marker may also be associated with the recognition environment information.

The information processing device 100 of the third example embodiment is operable to obtain the same advantageous effects as in the first and second example embodiments.

The present invention is described by each of the aforementioned example embodiments as an exemplary example. The present invention, however, is not limited to the aforementioned example embodiments. Specifically, the present invention may incorporate various configurations comprehensible to a person skilled in the art within the scope of the present invention.

This application claims the priority based on Japanese Patent Application No. 2014-173111 filed on Aug. 27, 2014, and all of the disclosure of which is hereby incorporated.

A part or all of the aforementioned example embodiments may also be described as the following Supplemental Notes, but are not limited to the following.

(Supplemental Note 1)

An information processing device including:
  detection means for detecting a marker at a certain position within a field of view of an imaging device from an image acquired from the imaging device; and
  environment acquisition means for acquiring recognition environment information representing an appearance of an target object to be recognized at the position on an image to be captured by the imaging device based on image information on the marker detected.

(Supplemental Note 2)

The information processing device according to Supplemental Note 1, wherein
  the marker is formed by a dot pattern which satisfies a constraint on the number of dots based on a minimum number of pixels by which a recognition engine can recognize the target object to be recognized, and
  the environment acquisition means acquires the number of pixels of the target object to be recognized at the position as the recognition environment information with use of the number of pixels included in an image area of the marker detected.

(Supplemental Note 3)

The information processing device according to Supplemental Note 2, wherein
  the environment acquisition means
  acquires the number of pixels included in the image area of the marker detected as the number of pixels of the target object to be recognized at the position when a size of the marker is the same as a size of the target object to be recognized, and
  acquires the number of pixels of the target object to be recognized at the position by converting the number of pixel included in the image area of the marker detected with a ratio between the size of the marker and the size of the target object to be recognized when the size of the marker is different from the size of the target object to be recognized.

(Supplemental Note 4)

The information processing device according to Supplemental Note 2 or Supplemental Note 3, wherein
  the dot pattern of the marker includes a white dot group and a black dot group, and
  the environment acquisition means acquires information on a degree of blur and brightness at the position as the recognition environment information based on image information on a white dot and a black dot included in the marker detected.

(Supplemental Note 5)

The information processing device according to any one of Supplemental Notes 2 to 4, wherein
  the dot pattern of the marker represents a shape of which three directions orthogonal to each other from a certain reference point are constantly acquirable, and
  the environment acquisition means acquires an angle of the target object to be recognized to a capturing direction of the imaging device as the recognition environment information based on image information on the dot pattern of the marker detected.

(Supplemental Note 6)

The information processing device according to any one of Supplemental Notes 2 to 5, wherein
  the dot pattern of the marker includes a red dot, a green dot, and a blue dot, and
  the environment acquisition means acquires hue information at the position as the recognition environment information based on image information on the red dot, the green dot, and the blue dot included in the marker detected.

(Supplemental Note 7)

The information processing device according to any one of Supplemental Notes 2 to 6, wherein
  the dot pattern of the marker includes a first partial dot pattern of a square shape, a second partial dot pattern of a square shape smaller than the first partial dot pattern, and a plurality of third partial dot patterns, each of which has a square shape and is formed by a dot of one color,
  the first partial dot pattern and the second partial dot pattern are aligned in a vertical direction in such a manner that a first straight line connecting a center point of the first partial dot pattern and a center point of the second partial dot pattern is orthogonal to a side of each of the first partial dot pattern and the second partial dot pattern,
  the plurality of third partial dot patterns are divided into a first group aligned on a right side, and a second group aligned on a left side with respect to the second partial dot pattern,
  the third partial dot patterns in each of the first group and the second group are aligned in a vertical direction in such a manner that a straight line connecting center points of the third partial dot patterns is in parallel to the first straight line,
  the first partial dot pattern and the second partial dot pattern are constituted by a square black frame formed by black dots, a square white frame adjacent to an inner side of the black frame and formed by white dots, and a square black dot group adjacent to an inner side of the white frame, and
  the plurality of third partial dot patterns at least include a red dot, a green dot, a blue dot, and a yellow dot.

(Supplemental Note 8)

The information processing device according to any one of Supplemental Notes 1 to 7, further including:
  data generation means for generating data for use in printing the marker on an A4-size longitudinal sheet when the target object to be recognized is a head or a face of a human.

(Supplemental Note 9)

The information processing device according to any one of Supplemental Notes 1 to 8, further including:
  display processing means for causing a display unit to display a display screen on which the recognition environment information is superimposed on an image acquired from the imaging device in a state that a correlation with respect to the marker detected is visually recognizable.

(Supplemental Note 10)

The information processing device according to any one of Supplemental Notes 1 to 9, further including:

position acquisition means for acquiring position information representing a relative position of the marker to a position of the imaging device as a reference; and display processing means for causing a display unit to display, based on a plurality of pieces of the recognition environment information acquired relating to a plurality of positions within a field of view of the imaging device, a display screen on which the plurality of pieces of the recognition environment information are rendered on a coordinate representing a relative positional relationship to a position of the imaging device as a reference.

(Supplemental Note 11)

The information processing device according to Supplemental Note 10, wherein the display processing means renders at least one of a position and a field of view of the imaging device on the coordinate.

(Supplemental Note 12)

The information processing device according to Supplemental Note 10 or 11, wherein the position acquisition means acquires the position information representing a position on a plane in parallel to a floor surface associated with the position of the marker based on image information of the marker detected, height information of the marker, and a camera parameter of the imaging device.

(Supplemental Note 13)

The information processing device according to any one of Supplemental Notes 1 to 12, further including:

display processing means for causing a display unit to display a quasi-image to be obtained by applying image processing to an original image representing the target object to be recognized in a normal state in such a manner that the target object to be recognized within the original image appears in terms of the recognition environment information acquired.

(Supplemental Note 14)

The information processing device according to any one of Supplemental Notes 1 to 12, further including:

display processing means for causing a display unit to display a plurality of pieces of the recognition environment information acquired relating to a same position within a field of view of the imaging device from images captured at different times in association with captured times of images.

(Supplemental Note 15)

A recognition support method to be executed by a computer including:

detecting a marker at a certain position within a field of view of an imaging device from an image acquired from the imaging device; and acquiring recognition environment information representing an appearance of an target object to be recognized at the position on an image to be captured by the imaging device based on image information on the marker detected.

(Supplemental Note 16)

The recognition support method according to Supplemental Note 15, wherein the marker is formed by a dot pattern which satisfies a constraint on the number of dots based on the minimum number of pixels by which a recognition engine can recognize the target object to be recognized, and acquiring the recognition environment information includes acquiring the number of pixels of the target object to be recognized at the position with use of the number of pixels included in an image area of the marker detected.

(Supplemental Note 17)

The recognition support method according to Supplemental Note 16, wherein acquiring the recognition environment information includes:

acquiring the number of pixels included in the image area of the marker detected as the number of pixels of the target object to be recognized at the position when a size of the marker is the same as a size of the target object to be recognized, and acquiring the number of pixels of the target object to be recognized at the position by converting the number of pixel included in the image area of the marker detected with a ratio between the size of the marker and the size of the target object to be recognized when the size of the marker is different from the size of the target object to be recognized.

(Supplemental Note 18)

The recognition support method according to Supplemental Note 16 or Supplemental Note 17, wherein the dot pattern of the marker includes a white dot group and a black dot group, and acquiring the recognition environment information includes acquiring information relating to a degree of blur and brightness at the position based on image information of a white dot and a black dot included in the marker detected.

(Supplemental Note 19)

The recognition support method according to any one of Supplemental Notes 16 to 18, wherein the dot pattern of the marker represents a shape of which three directions orthogonal to each other from a certain reference point are constantly acquirable, and acquiring the recognition environment information includes acquiring an angle of the target object to be recognized to a capturing direction of the imaging device based on image information on the dot pattern of the marker detected.

(Supplemental Note 20)

The recognition support method according to any one of Supplemental Notes 16 to 19, wherein the dot pattern of the marker includes a red dot, a green dot, and a blue dot, and acquiring the recognition environment information includes acquiring hue information at the position based on image information on the red dot, the green dot, and the blue dot included in the marker detected.

(Supplemental Note 21)

The recognition support method according to any one of Supplemental Notes 16 to 20, wherein the dot pattern of the marker includes a first partial dot pattern of a square shape, a second partial dot pattern of a square shape smaller than the first partial dot pattern, and a plurality of third partial dot patterns, each of which has a square shape and is formed by a dot of one color, the first partial dot pattern and the second partial dot pattern are aligned in a vertical direction in such a manner that a first straight line connecting a center point of the first partial dot pattern and a center point of the second partial dot pattern is orthogonal to a side of each of the first partial dot pattern and the second partial dot pattern, the plurality of third partial dot patterns are divided into a first group aligned on a right side, and a second group aligned on a left side with respect to the second partial dot pattern, the third partial dot patterns in each of the first group and the second group are aligned in a vertical direction in such a manner that a straight line connecting center points of the third partial dot patterns is in parallel to the first straight line, the first partial dot pattern and the second partial dot pattern are constituted by a square black frame formed by black dots, a square white frame adjacent to an inner side of the black frame and formed by white dots, and a square black dot group adjacent to an inner side of the white frame, and the plurality of third partial dot patterns at least include a red dot, a green dot, a blue dot, and a yellow dot.

(Supplemental Note 22)

The recognition support method according to any one of Supplemental Notes 15 to 21, further including:

generating data for use in printing the marker on an A4-size longitudinal sheet when the target object to be recognized is a head or a face of a human.

(Supplemental Note 23)

The recognition support method according to any one of Supplemental Notes 15 to 22, further including:

causing a display unit to display a display screen on which the recognition environment information is superimposed on the image acquired from the imaging device in a state that a correlation with respect to the marker detected is visually recognizable.

(Supplemental Note 24)

The recognition support method according to any one of Supplemental Notes 15 to 22, further including:

acquiring position information representing a relative position of the marker to a position of the imaging device as a reference; and causing a display unit to display, based on a plurality of pieces of recognition environment information acquired relating to a plurality of positions within a field of view of the imaging device, a display screen on which the plurality of pieces of recognition environment information are rendered on a coordinate representing a relative positional relationship with respect to a position of the imaging device as a reference.

(Supplemental Note 25)

The recognition support method according to Supplemental Note 24, wherein at least one of a position and a field of view of the imaging device is further rendered on the coordinate.

(Supplemental Note 26)

The recognition support method according to Supplemental Note 24 or 25, wherein acquiring the position information includes acquiring the position information representing a position on a plane in parallel to a floor surface associated with the position of the marker based on image information of the marker detected, height information of the marker, and a camera parameter of the imaging device.

(Supplemental Note 27)

The recognition support method according to any one of Supplemental Notes 15 to 26, further including:

causing a display unit to display a quasi-image to be obtained by applying image processing to an original image representing the target object to be recognized in a normal state in such a manner that the target object to be recognized within the original image appears in terms of the acquired recognition environment information.

(Supplemental Note 28)

The recognition support method according to any one of Supplemental Notes 15 to 27, further including:

causing a display unit to display a plurality of pieces of recognition environment information acquired relating to a same position within a field of view of the imaging device from images captured at different times in association with captured times of images.

(Supplemental Note 29)

A program storage medium storing a program that causes a computer to execute the recognition support method according to any one Supplemental Notes 15 to 28.

REFERENCE SIGNS LIST

5 Display device
7 Camera
10 Information processing device (support device)
11 Image acquisition unit
12, 101 Detection unit
13 Storage unit
14, 102 Environment acquisition unit
15 Display processing unit
16 Data generation unit
17 Position acquisition unit
100 Information processing device

The invention claimed is:

1. An information processing device comprising:
at least one memory storing instructions; and
at least one processor configured to execute the instructions to:
  detect a marker from a first image that has been captured;
  acquire information representing recognition status of the marker in the first image; and
  based on the information, control a display device including a display screen such that a second image is displayed superimposedly on a part of the first image, the second image corresponded with the information and changed based on the information,
wherein the marker is two dimensional code.

2. The information processing device according to claim 1, wherein the information represents the recognition status of the marker in that recognition is to occur at a position where the marker is disposed.

3. The information processing device according to claim 1, wherein the marker is disposed at an arbitrary place within a target area at which recognition is to occur.

4. The information processing device according to claim 1, wherein the information is acquired based on image information on the marker as detected from the first image.

5. The information processing device according to claim 1, wherein the marker includes a grid pattern comprising black grids and white grids.

6. A recognition support method comprising:
detecting, by a computer, a marker from a first image that has been captured;
acquiring, by the computer, information representing recognition status of the marker in the first image; and based on the information, controlling, by the computer, a display device including a display screen such that a second image is displayed superimposedly on a part of the first image, the second image corresponded with the information and changed based on the information, wherein the marker is two dimensional code.

7. The recognition support method according to claim 6, wherein the information represents the recognition status of the marker in that recognition is to occur at a position where the marker is disposed.

8. The recognition support method according to claim 6, wherein the marker is disposed at an arbitrary place within a target area at which recognition is to occur.

9. The recognition support method according to claim 6, wherein the information is acquired based on image information on the marker as detected from the first image.

10. The recognition support method according to claim 6, wherein the marker includes a grid pattern comprising black grids and white grids.

11. A non-transitory program storage medium storing a computer program executable by a computer to perform comprising:
   detecting a marker from a first image that has been captured;
   acquiring information representing recognition status of the marker in the first image; and
   based on the information, controlling a display device including a display screen such that a second image is displayed superimposedly on a part of the first image, the second image corresponded with the information and changed based on the information, wherein the marker is two dimensional code.

12. The non-transitory program storage medium according to claim 11, wherein the information represents the recognition status of the marker in that recognition is to occur at a position where the marker is disposed.

13. The non-transitory program storage medium according to claim 11, wherein the marker is disposed at an arbitrary place within a target area at which recognition is to occur.

14. The non-transitory program storage medium according to claim 11, wherein the information is acquired based on image information on the marker as detected from the first image.

15. The non-transitory program storage medium according to claim 11, wherein the marker includes a grid pattern comprising black grids and white grids.

\* \* \* \* \*